United States Patent [19]
Austvold et al.

[11] Patent Number: 5,444,824
[45] Date of Patent: * Aug. 22, 1995

[54] ENHANCED NEURAL NETWORK SHELL FOR APPLICATION PROGRAMS

[75] Inventors: Shawn M. Austvold; Joseph P. Bigus; Jonathan D. Henckel; Paul A. Hospers, all of Rochester, Minn.

[73] Assignee: International Business Machines Corporation, Armonk, N.Y.

[*] Notice: The portion of the term of this patent subsequent to Aug. 10, 2010 has been disclaimed.

[21] Appl. No.: 101,526

[22] Filed: Aug. 3, 1993

Related U.S. Application Data

[62] Division of Ser. No. 687,582, Apr. 18, 1991, Pat. No. 5,235,673.

[51] Int. Cl.⁶ .............................................. G06F 15/18
[52] U.S. Cl. ........................................ 395/76; 395/21
[58] Field of Search ............................. 395/21, 22, 76

[56] References Cited

U.S. PATENT DOCUMENTS 5,142,665  8/1992  Bigus ................................ 395/21

OTHER PUBLICATIONS

Gambale, et al., "Nueral Works Professional II/ Plus," Software Review, AI Expert, Jul. 1991, 51–59.
Bailey et al., "How to Develop Neural-Network Applications," AI Expert, Jun. 1990, 38–47.
Bailey et al., "Developing Neural-Network Applications," AI Expert, Sep. 1990, 34–41.
"Autonet v. 2.01 released," Product Showcase, AI Expert, Dec. 1990, 66–67.
"Neuralworks Professional II," Product Showcase, AI Expert, Mar. 1991, 62 & Back Cover.
NTIS Tech Notes Dec. 1990, Springfield, Va., US, p. 1034, P. T. Baffes, "Program Aids Simulation of Neural Networks".
"Handbook of Neural Computing Applications", Alianna J. Maren, Ph.D., 1990, Academic Press, San Diego, USA, pp. 50–70.
Proceedings: Tools for Artificial Intelligence TAI 90, Nov. 6, 1990, Herndon, USA, pp. 118–124, S. C. Ahalt, "The Neural Shell: A Neural Network Simulation Tool".
IEEE MICRO, Dec. 1990, New York US, pp. 28–31, and pp. 99–102, B. Angeniol, "Pygmalion: ESPRIT II Project 2059, Neurocomputing".
"Neural Network Simulation Package from Ohio State University", K. L. Wickham, Aug. 1990, EGG-COD-P-9224, DE91 002333, pp. 1–11.
The Computer Journal, Feb. 1991, No. 1, Cambridge, GB, "A Neural Network Simulating System", pp. 92–93.

*Primary Examiner*—Robert W. Downs
*Attorney, Agent, or Firm*—Roy W. Truelson; Owen J. Gamon

[57] ABSTRACT

An enhanced neural network shell for application programs is disclosed. The user is prompted to enter in non-technical information about the specific problem type that the user wants solved by a neural network. The user also is prompted to indicate the input data usage information to the neural network. Based on this information, the neural network shell creates a neural network data structure by automatically selecting an appropriate neural network model and automatically generating an appropriate number of inputs, outputs, and/or other model-specific parameters for the selected neural network model. The user is no longer required to have expertise in neural network technology to create a neural network data structure.

5 Claims, 42 Drawing Sheets

Module Problem Type          System:   XXXXXXX

Select one of the following:

1. Classification
2. Time series forecasting
3. Scheduling
4. Resource Allocation
5. Data reconstruction
6. Cluster Analysis
7. Closed-path routing Selection
—

F3=Exit   F12=Cancel

FIG. 11

```
Type changes, press Enter.

Fields per record . . . . 7____      1-999999
   Delimiter . . . . . . . . W          W=white, C=comma F12=Cancel
```

FIG. 12B

```
Problem Parameters and Field Use

System:    XXXXXXXX

Type options, press Enter.
  I=Input  O=Output  X=Ignore

Use   Field Name
 __   FIELD1__
 __   FIELD2__
 __   FIELD3__
 __   FIELD4__
 __   FIELD5__
 __   FIELD6__
 __   FIELD7__

Bottom
F3=Exit   F12=Cancel
```

FIG. 12C

Problem Parameters and Field Use        System:    XXXXXXXX

Type options, press Enter.
 I=Input  O=Output  X=Ignore

Use     Field Name
 I       COLOR___
 I       PROFILE___
 I       BUILDING___
 I       EAGLE___
 I       LEAVES___
 I       TORCH___
 O       COINTYPE___

Bottom
F3=Exit   F12=Cancel

FIG. 12D

```
. . . . . . . . . . . . . . . . . . . . . . . . . . . .
.                                                      .
.  Additional Input Data Usage Information for         .
.  Time Series Forecasting Problem                     .
.                                                      .
.     Window Size . . . . . . .  _____   1-999999      .
.                                                      .
.  F12=Cancel                                          .
.                                                      .
. . . . . . . . . . . . . . . . . . . . . . . . . . . .
```

FIG. 12E-1

```
. . . . . . . . . . . . . . . . . . . . . . . . . . . .
.                                                      .
.  Additional Input Data Usage Information for         .
.  Cluster Analysis Problem                            .
.                                                      .
.     Number of Clusters . . .  _____   1-999999       .
.                                                      .
.  F12=Cancel                                          .
.                                                      .
. . . . . . . . . . . . . . . . . . . . . . . . . . . .
```

FIG. 12E-2

```
. . . . . . . . . . . . . . . . . . . . . . . . . . . .
.                                                      .
.  Additional Input Data Usage Information for         .
.  Closed Path Problem                                 .
.                                                      .
.     Maximum Number of Destinations    1-999999       .
.                                                      .
.  F12=Cancel                                          .
.                                                      .
. . . . . . . . . . . . . . . . . . . . . . . . . . . .
```

FIG. 12E-3

```
                Constraint Editor               System:  XXXXXXX

Skill and Name
                 1      1      2      2
         Task    Bill   Gill   Jill   Will
Group
Monday    A      ____   ____   ____   ____
Monday    B      ____   ____   ____   ____
Tuesday   A      ____   ____   ____   ____
Tuesday   B      ____   ____   ____   ____
Tuesday   C      ____   ____   ____   ____

Bottom

F3=Exit       F4=Prompt       F6=Change constraint values
F10=File constraints          F12=Cancel
```

FIG. 12F

```
                Constraint Editor Options                 System:    XXXXXXX Select one of the following:

1. Change constraint values
    2. Change heading labels
    3. Work with row groups
    4. Work with row items
    5. Work with column groups
    6. Work with column items Selection
   _

F3=Exit   F12=Cancel
```

FIG. 12G

```
                    Work with Row Groups
                                               System:   XXXXXXX Type options, press Enter.
  1=Create  2=Change  4=Delete Opt  Group      Constraint
     ────────   ──────────────────
     Monday     NONE
     Tuesday    MUTUALLY-EXCLUSIVE
     Wednesday  ALL-OR-NONE Bottom
F3=Exit   F12=Cancel
```

FIG. 12H

```
                    Teach Neural Network (TCHNRLNET)

Type choices, press Enter.

Data Set . . . . . . . . . . . .   QANWCOIN      Name
  Library . . . . . . . . . . .     *LIBL       Name,   *LIBL, *CURLIB
Data Set Member . . . . . . . .    COINDEMO      Name,   *FIRST
Neural Network  . . . . . . . .    COINNET       Name
  Library . . . . . . . . . . .     *CURLIB     Name,   *LIBL, *CURLIB
Interface program . . . . . . .    QNWGCOIN      Name
  Library . . . . . . . . . . .     *LIBL       Name,   *LIBL, *CURLIB
Patterns per cycle  . . . . . .    10            1-99999
Input mode  . . . . . . . . . .    *AUTO         *AUTO, *ENTER
Display data  . . . . . . . . .    *NO           *YES, *NO
Log data  . . . . . . . . . . .    *NO           *YES, *NO
Initialize network  . . . . . .    *NO           *YES, *NO
Interactive environment . . . .    *YES          *YES, *NO Bottom
F3=Exit  F4=Prompt  F5=Refresh  F12=Cancel  F13=How to use this display
F24=More keys
```

FIG. 13

```
            Teach Neural Network Environment

Data Set . . . . . . . . . . . :    QANWCOIN
  Library  . . . . . . . . . . :    QNNU
  Member . . . . . . . . . . . :    COINDEMO Neural network . . . . . . . . :    COINNET
  Library  . . . . . . . . . . :    *CURLIB Interface program  . . . . . . :    QNWGCOIN
  Library  . . . . . . . . . . :    QNNU Type choices, press Enter.

Log data . . . . . . . . . . . .    N          Y=Yes, N=No
  Display data . . . . . . . . . .    N          Y=Yes, N=No
  Input mode . . . . . . . . . . .    1          1=Auto, 2=Enter F3=Exit  F9=Teach  F10=Save/load Network  F12=Cancel
```

```
                    Teach Neural Network

Network  . . . . . . . . . :  COINNET    Status . . . . . . . . . :  Training
Type . . . . . . . . . . . :  *BKP       Epochs . . . . . . . . . :         0

Network Training Parameters

Learn Rate  . . . . . . . :  0.50000     Epoch update . . . . . . :  N
Momentum  . . . . . . . . :  0.90000     Random inputs  . . . . . :  N
Pattern Error . . . . . . :  0.00000     Input Units  . . . . . . :  6
Epoch Error . . . . . . . :  0.00000     Hidden L1  . . . . . . . :  2
Tolerance . . . . . . . . :  0.10000     Hidden L2  . . . . . . . :  0
                                         Output Units . . . . . . :  4

Type choices, press Enter.

Patterns per cycle  . . . . . . . . . .        10       1-99999
Refresh rate  . . . . . . . . . . . . .        10       1-99999

F3=Exit  F9=Change Parameters  F10=Display Array
F12=Cancel
```

```
Select Network Array

Type option, press Enter.
  1=Select

Option  Array
  1     Activations
  _     Weights
  _     Thresholds
  _     Weight deltas
  _     Threshold deltas
  _     Teach vector
  _     Error vector
  _     Error deltas
  _     Net inputs
  _     Weight derivatives
  _     Threshold derivative F3=Exit   F12=Cancel
```

FIG. 16

```
              Display Network Array

Network array  . . . . . . . . . . :
Array index    . . . . . . . . . .        Activations
Position to    . . . . . . . . . .     1           1-16, F4 for list 1      0.00000    1.00000    1.00000    0.00000    0.00000
     6      0.00000    0.02918    0.01216    0.09496    0.71028
    11      0.42564    0.02567    0.00000    0.00000    0.00000

F3=Exit  F4=Prompt  F10=Step  F11=Cycle  F12=Cancel
```

FIG. 17

```
                Display Neural Network

Network . . . . . . . . . :
Type  . . . . . . . . . . :  COINNET     Status . . . . . . . . . : LOCKED
Version . . . . . . . . . :  *BKP        Epochs . . . . . . . . . :     328
                             1.2-100989

Parameter 1 . . . . . . . :  0.50000     Boolean 1  . . . . . . . : N
Parameter 2 . . . . . . . :  0.90000     Boolean 2  . . . . . . . : N
Parameter 3 . . . . . . . :  0.00000     Boolean 3  . . . . . . . : N
Parameter 4 . . . . . . . :  0.00000     Boolean 4  . . . . . . . :
Parameter 5 . . . . . . . :  0.10000     Net String 1 . . . . . . :
Parameter 6 . . . . . . . :  0.00000     Net Time . . . . . . . . :   14.63

Net Sizes 1 . . . . . . . :  6           Net Index 1  . . . . . . : 7
Net Sizes 2 . . . . . . . :  2           Net Index 2  . . . . . . : 8
Net Sizes 3 . . . . . . . :  0           Net Index 3  . . . . . . : 9
Net Sizes 4 . . . . . . . :  4           Net Index 4  . . . . . . : 8
Net Sizes 5 . . . . . . . :  12          Net Index 5  . . . . . . : 9

F3=Exit  F9=Display Offsets  F10=Display Array
F12=Cancel
```

FIG. 18

```
                COIN IDENTIFICATION DEMO

Parameters                        Results

TYPE   : PENNY                    TYPE   : PENNY

COLOR  : BRONZE                   PENNY  :  0.9073972
     PROFILE: RIGHT                    NICKEL :  0.0837411
     BUILD  : Y                        DIME   :  0.0000205
     EAGLE  : N                        QUARTER:  0.0009220
     LEAVES : N
     TORCH  : N

F3=Exit  F9=Change Parameters  F10=Display Array
   F12=Cancel
```

```
            COIN IDENTIFICATION DEMO

Parameters                    Results

TYPE   : NICKEL              TYPE    : NICKEL

COLOR  : SILVER              PENNY   : 0.0814387
PROFILE: LEFT                NICKEL  : 0.9090260
BUILD  : Y                   DIME    : 0.0953377
EAGLE  : N                   QUARTER : 0.0010652
LEAVES : N
TORCH  : N

F3=Exit  F9=Change Parameters  F10=Display Array
F12=Cancel
```

FIG. 19C

```
         COIN IDENTIFICATION DEMO

Parameters                          Results

TYPE    : DIME                      TYPE   : DIME

COLOR   : SILVER                    PENNY  :  0.0007919
PROFILE : LEFT                      NICKEL :  0.0933161
BUILD   : N                         DIME   :  0.9135095
EAGLE   : N                         QUARTER:  0.0552445
LEAVES  : Y
TORCH   : Y
```

F3=Exit  F9=Change Parameters  F10=Display Array
F12=Cancel

COIN IDENTIFICATION DEMO

Parameters

TYPE    : QUARTER

COLOR   : SILVER
PROFILE : LEFT
BUILD   : N
EAGLE   : Y
LEAVES  : Y
TORCH   : N

Results

TYPE    : QUARTER

PENNY   : 0.0005139
NICKEL  : 0.0000019
DIME    : 0.0735790
QUARTER : 0.9069203

F3=Exit  F9=Change Parameters  F10=Display Array
F12=Cancel

```
         COIN IDENTIFICATION DEMO

Type choices, Press Enter.

Parameters                      Results

TYPE    :                       TYPE    :  NICKEL

COLOR  : BRONZE                 PENNY   :  0.2424682
    PROFILE: LEFT                   NICKEL  :  0.4865323
    BUILD  : Y                      DIME    :  0.3173019
    EAGLE  : N                      QUARTER :  0.0923763
    LEAVES : N
    TORCH  : N

F3=Exit  F12=Cancel
```

ENHANCED NEURAL NETWORK SHELL FOR APPLICATION PROGRAMS

This is a divisional of application Ser. No. 07/687,582 filed on Apr. 18, 1991, now U.S. Pat. No. 5,235,673.

FIELD OF THE INVENTION

The present invention relates to data processing systems, and in particular to improving the usability of a neural network executing on a computer system.

BACKGROUND OF THE INVENTION

Modern computer systems are being used to solve an ever increasing range of complex problems. The use of such computers to perform tasks normally associated with human reasoning and cognition is known as artificial intelligence. As the capabilities of computers expand, they are increasingly being used to perform tasks in the field of artificial intelligence. However, although computer hardware to perform complex tasks is available, it is very difficult and time-consuming to write artificial intelligence programs.

In recent years, there has been an increasing amount of interest in solving complex problems with neural networks. A neural network is a collection of simple processors (nodes) connected together, each processor having a plurality of input and output connections. Each processor evaluates some relatively simple mathematical function of the inputs to produce an output. Some of the processor nodes receive input or produce output external to the network, but typically most connections run between nodes in the network. An adaptive weighting coefficient is associated with each connection. A neural network is trained to solve a particular problem by presenting the network with examples of input data for the problem and the desired outputs. The network adjusts the weighting coefficients to minimize the difference between the output values of the network and the desired output values of the training data. Ideally, a neural network consists of physically separate processor nodes. However, such a network is frequently simulated on a single processor computer system with suitable programming. As used herein, the term "neural network" shall encompass an ideal network of separate physical processors for each node as well as a simulated network executing on a single or other multiple processor computer system.

The promise of neural networks has been that they can be programmed with less programming effort and expertise than conventional application programs designed to solve problems in the field of artificial intelligence. Before a programmer can use neural network technology as part of an otherwise conventional application program, however, a considerable amount of programming effort and neural network expertise is required. Commonly assigned U.S. patent application Ser. No. 07/482,450, filed Feb. 2, 1990, discloses a neural network shell for application programs that eliminates much of the programming effort and neural network expertise required in using neural network technology in an application program. Unfortunately, the neural network shell of this patent application still requires some programming effort and neural network expertise. For example, there are several different neural network models known in the art, such as the Back Propagation Model, the Adaptive Resonance Theory Model, the Self-Organizing Feature Maps Model, the Self-Organizing Routing (TSP) Networks Model, the Constraint Satisfaction Model, and the Learning Vector Quantization Network Model. These models can be quite effective at solving specific types of problems, but are quite ineffective at solving other types of problems. A programmer wishing to develop a neural network would have to possess a considerable amount of knowledge of neural network technology before he would know which neural network model would be most appropriate for solving his specific problem.

A neural network also requires that data be presented to it in a specific, architected form the neural network model understands. The programmer must decide what information is to be used as input and output, along with deciding additional model-dependent information, such as the number of hidden inputs, tasks, resources, or constraints. This decision is very difficult to do without expertise in neural network technology.

It is a primary object of the invention to provide an enhanced neural network shell for application programs.

It is another object of the invention to provide an enhanced neural network shell for application programs that requires little programming effort or neural network expertise.

It is another object of this invention to provide an enhanced neural network shell for application programs that automatically selects an appropriate neural network model.

It is another object of this invention to provide an enhanced neural network shell for application programs that automatically selects an appropriate neural network model based on user input describing the type of problem to be solved.

It is another object of this invention to provide an enhanced neural network shell. for application programs that automatically generates an appropriate number of inputs, outputs, and other model-specific parameters for the selected neural network model.

These and other objects are accomplished by the enhanced neural network shell for application programs disclosed herein.

An enhanced neural network shell for application programs is disclosed. The user is prompted to enter in non-technical information about the specific problem type that the user wants solved by a neural network. The user also is prompted to indicate the input data usage information to the neural network. Based on this information, the neural network shell creates a neural network data structure by automatically selecting an appropriate neural network model and automatically generating an appropriate number of inputs, outputs, and/or other model-specific parameters for the selected neural network model. The user is no longer required to have expertise in neural network technology to create a neural network data structure.

CROSS REFERENCE TO RELATED APPLICATIONS

The below-identified commonly assigned patent applications are related to this patent application and each are hereby expressly incorporated by reference:

| Ser. No. | Filing Date | Inventor | Title |
|---|---|---|---|
| 07/482,450 | 2/2/90 | Bigus | Neural Network |

| Ser. No. | Filing Date | Inventor | Title |
|---|---|---|---|
| | 4/18/91 | Bigus et al | Shell for Application Program Apparatus and Method for Facilitating Use of a Neural Network |

For the benefit of the reader of this patent application, reference numerals that contain four digits, where the first digit is a "3" (i.e. 3002) indicate added or changed function over that shown in the patent application "Neural Network Shell for Application Program". Most of the added or changed function is shown in FIG. 4, FIGS. 7A–7I, FIGS. 12A–12H, and the accompanying description for creating neural network data structures.

BRIEF DESCRIPTION OF THE DRAWING

FIGS. 5, 6A, 6B, 6C, 6D, 7A, 7B-1, 7B-2, 7C, 7D, 7E, 7F, 7G, 7H, 7I, 8A, 8B, 8C, 9A, and 9B show the flowcharts of the invention.

FIGS. 11, 12A, 12B, 12C, 12D, 12E-1, 12E-2, 12E-3, 12F, 12G, 12H, 13–18, 19A, 19B, 19C, 19D, and 20 shows screens displayed to a user creating, training, and running an example neural network using the invention.

DESCRIPTION OF THE PREFERRED EMBODIMENT

Figure 1:
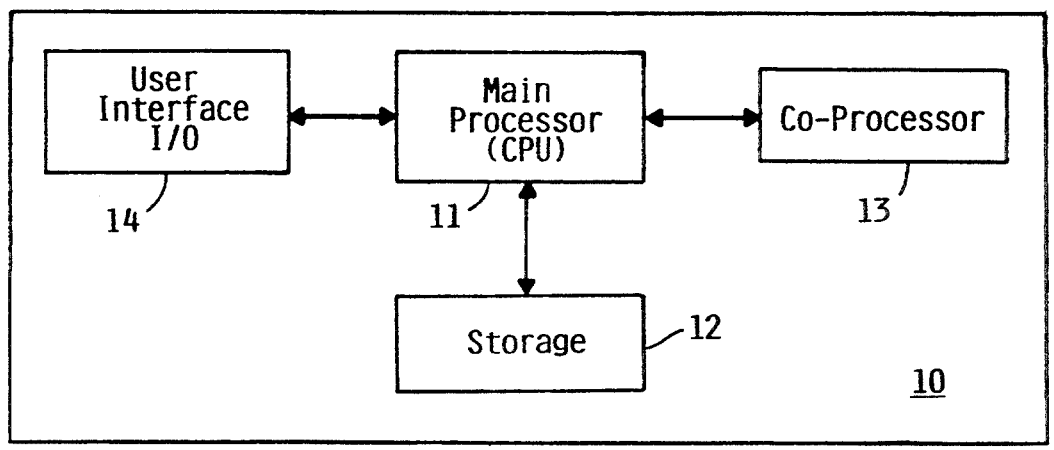
FIG. 1 shows a block diagram of the computer system of the invention.

FIG. 1 shows a block diagram of the computer system of the invention. Computer system 10 consists of main or central processing unit 11 connected to storage 12. Storage 12 can be primary memory such as RAM or secondary memory such as magnetic or optical storage. CPU 11 is in the preferred embodiment connected to co-processor 13. Co-processor 13 may provide generic math calculation functions (a math co-processor) or specialized neural network hardware support functions (a neural network processor). Co-processor 13 is not necessary if CPU 11 has sufficient processing power to handle an intensive computational workload without unacceptable performance degradation. CPU 11 is also connected to user interface 14. User interface 14 allows developers and users to communicate with computer system 10, normally through a programmable workstation.

In the preferred embodiment, computer system 10 is an IBM Application System/400 midrange computer, although any computer system could be used. Co-processor is preferably a processor on the Application System/400 midrange computer, but could also be the math co-processor found on personal computers, such as the IBM PS/2. In this case, CPU 11 and co-processor 13 would communicate with each other via IBM PC Support.

Figure 2:
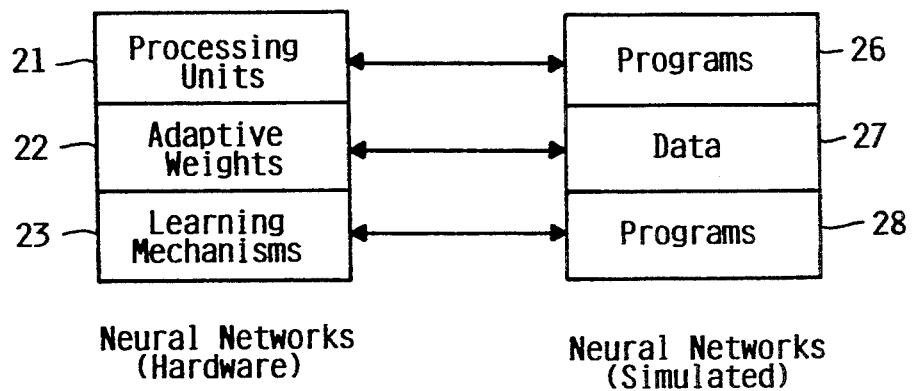
FIG. 2 show a massively parallel hardware implemented neural network can be simulated on a serial Von Neumann based computer system.

FIG. 2 shows how neural network (parallel) computers can be simulated on a Von Neumann (serial) processor system. There are many different neural network models with different connection topologies and processing unit attributes. However, they can be generally classified as computing systems which are made of many (tens, hundreds, or thousands) simple processing units 21 which are connected by adaptive (changeable) weights 22. In addition to processors and weights, a neural network model must have a learning mechanism 23, which operates by updating the weights after each training iteration.

A neural network model can be simulated on a digital computer by programs and data. Programs 26 simulate the processing functions performed by neural network processing units 21, and adaptive connection weights 22 are contained in data 27. Programs 28 are used to implement the learning or connection weight adaptation mechanism 23.

Figure 3A:
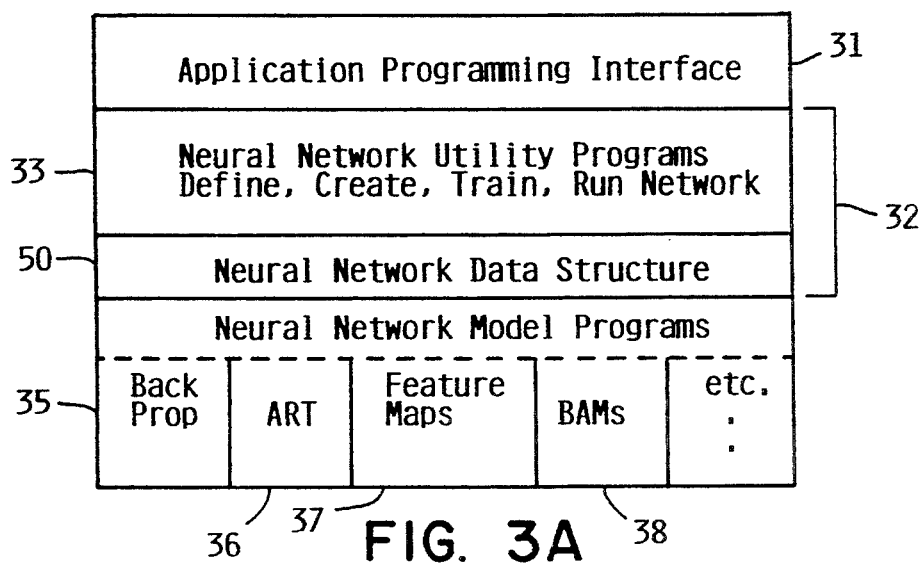
FIGS. 3A–3B show a conceptual framework of the computing environment of the invention.

FIG. 3A shows the conceptual layout of this invention and how it relates to application software. At the highest level is application programming interface 31 (API). API 31 is a formally specified interface which allows application developers lacking expert knowledge of neural networks to access and use the utility programs and data structure of neural network shell 32 in their application programs.

Neural network shell 32 consists of a set of utility programs 33 and a neural network data structure 50. Shell 32 provides the capability for easily and efficiently defining, creating, training, and running neural networks in applications on conventional computing systems. In the preferred embodiment, shell 32 is the IBM Neural Network Utility Program for the AS/400, although other shell programs using the teachings of this invention could also be used.

Any neural network model, such as example models 35–38, can be supported by neural network shell 32 by defining a generic neural network data structure 50 which can be accessed by all of the utility programs in neural network shell 32. Each neural network model is mapped onto this generic neural network data structure, described in more detail in FIG. 4. Programs specific to each neural network model are called by neural network utility programs 33, as will be discussed later.

Figure 3B:
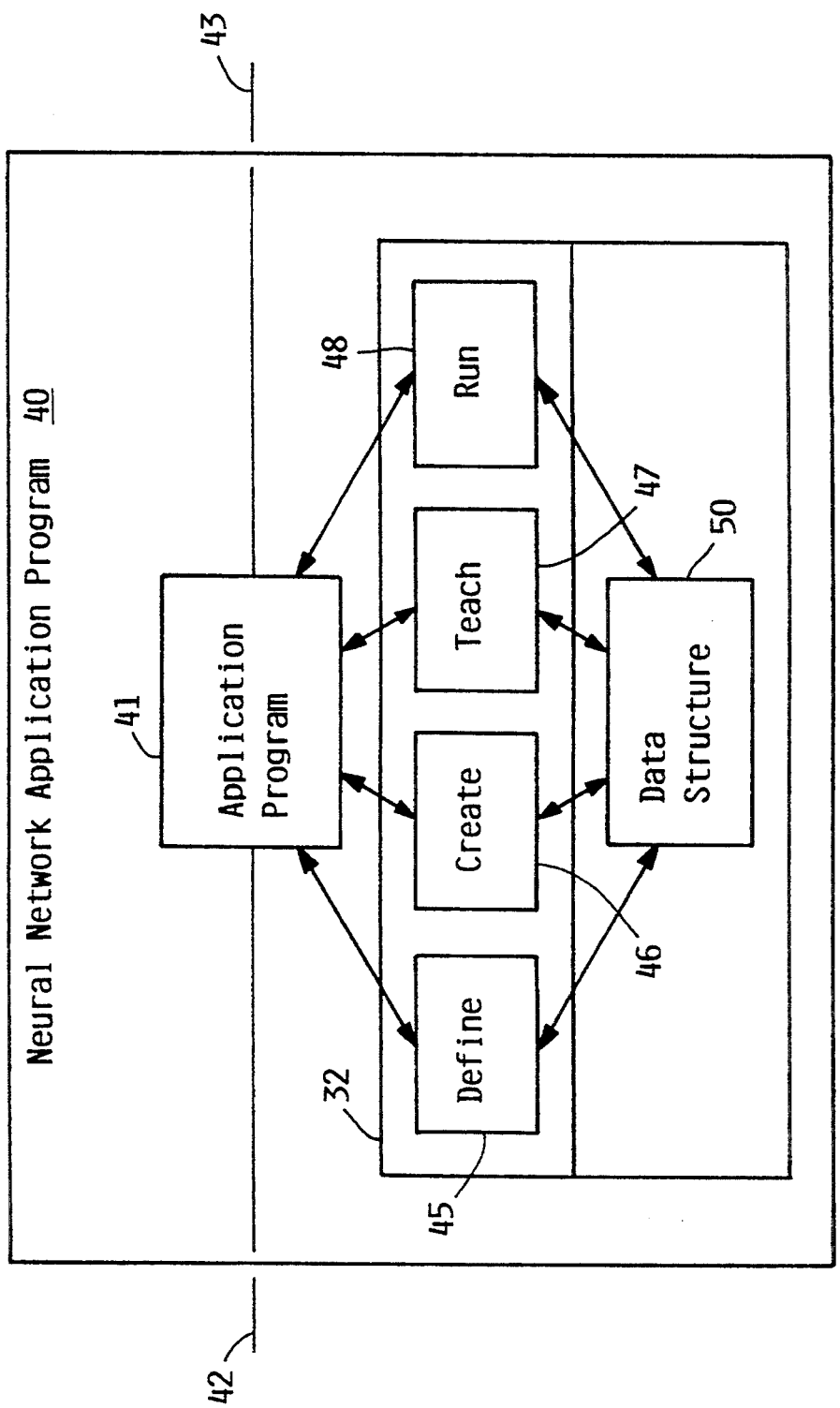

FIG. 3B shows how a normal application program 41 becomes a neural network application program 40 by interfacing with one or more of the neural network utility programs 45–48 in neural network shell 32. Utility programs 45–48 in turn interface with data structure 50. Data to be processed by neural network application program 40 (also referred to herein as "neural network") enters on input 42. After the data is run through the neural network, the result is output on output 43. Application program 41 and utility programs 45–48 reside in suitably programmed CPU 11 and/or co-processor 13 (FIG. 1). Data structure 50 resides in storage 12 and/Or in internal storage of CPU 11 and/or co-processor 13.

Figure 4:
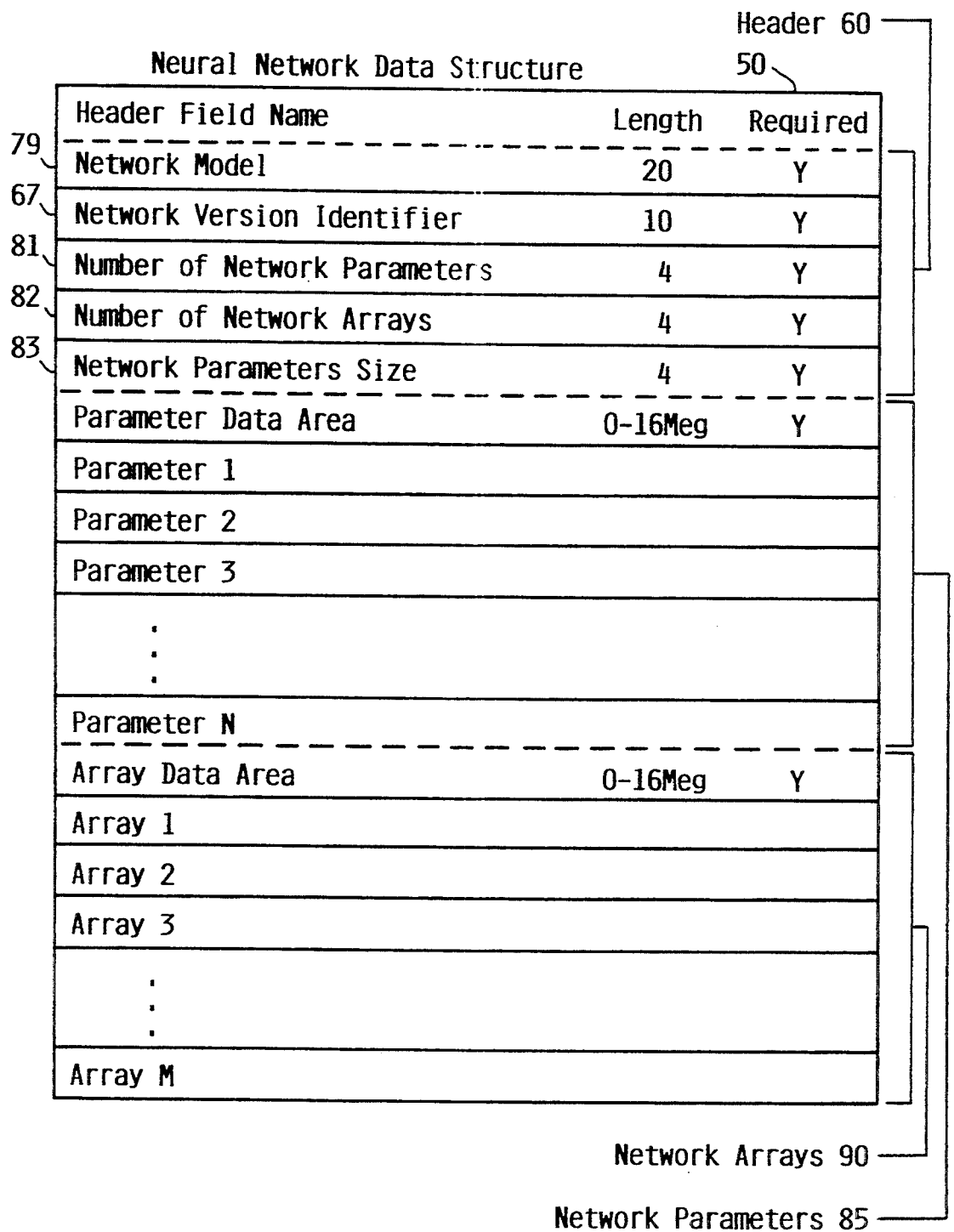
FIG. 4 shows the neural network data structure of the invention.

FIG. 4 shows neural network data structure 50 of the invention. Data structure 50 provides a common framework which allows any neural network model to be defined for use in an application program. This common framework is accomplished by providing data areas for network specific parameters and arrays. Chapter 5 of the attached Attachment I, entitled "Neural Network Utility/400: User's Guide (order number SC41-8202-0) shows how network parameters portion 85 and network array portion 90 of data structure 50 are used by the Back Propagation, Constraint Satisfaction Network, Adaptive Resonance Network, Self Organizing Feature Map, and Self Organizing Routing Network models. Attachment I was unpublished and unavailable to the public as of the filing date of this patent application.

Data structure 50 consists of header portion 60, parameter portion 85 and array portion 90.

Field 79 contains the name of the neural network model or type. An example neural network model name is "*BKP" for Back Propagation. This name is determined by the create neural network utility program, as will be discussed later.

Field 67 contains the network version identifier. This information is used to prevent mismatches between neural network shell programs and neural network data structures. As new versions or releases of software are developed, compatibility with existing networks is desirable. If any enhancements require changes to the fundamental network data structure, this field would allow detection of a software-to-data mismatch. The software could call a conversion routine to update the data structure format, or accept down level data structures.

Field 81 contains the number of network parameters in network parameters portion 85. Field 82 contains the number of network arrays in network arrays portion 90. Field 83 contains the size of network parameters portion 85.

Data structure 50 is created by the Create Neural Network utility program, as will be discussed later (FIGS. 7A-7I). The Teach and Run utility programs access data structure 50 to train and run the neural network.

Figure 5:
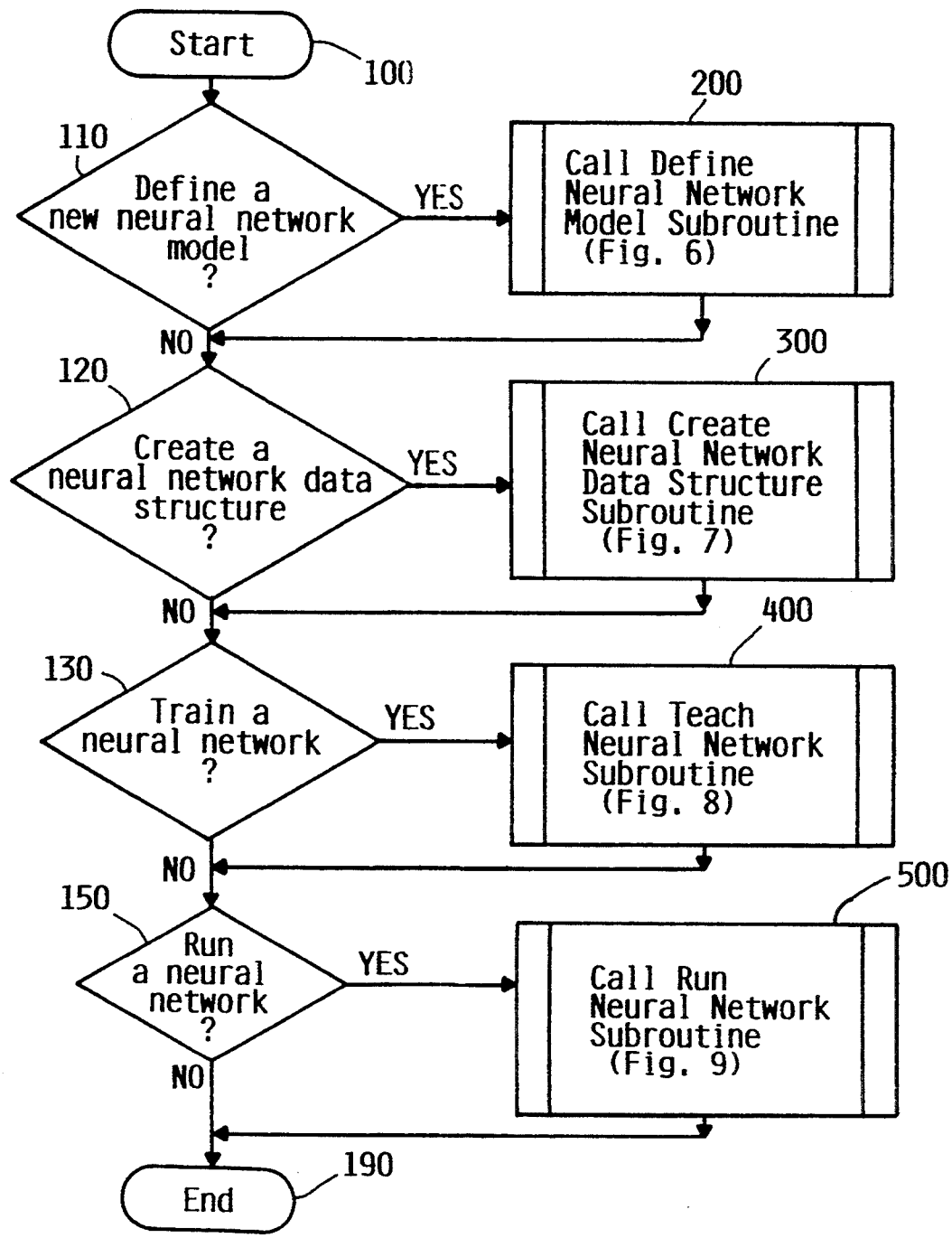
Figure 7A:
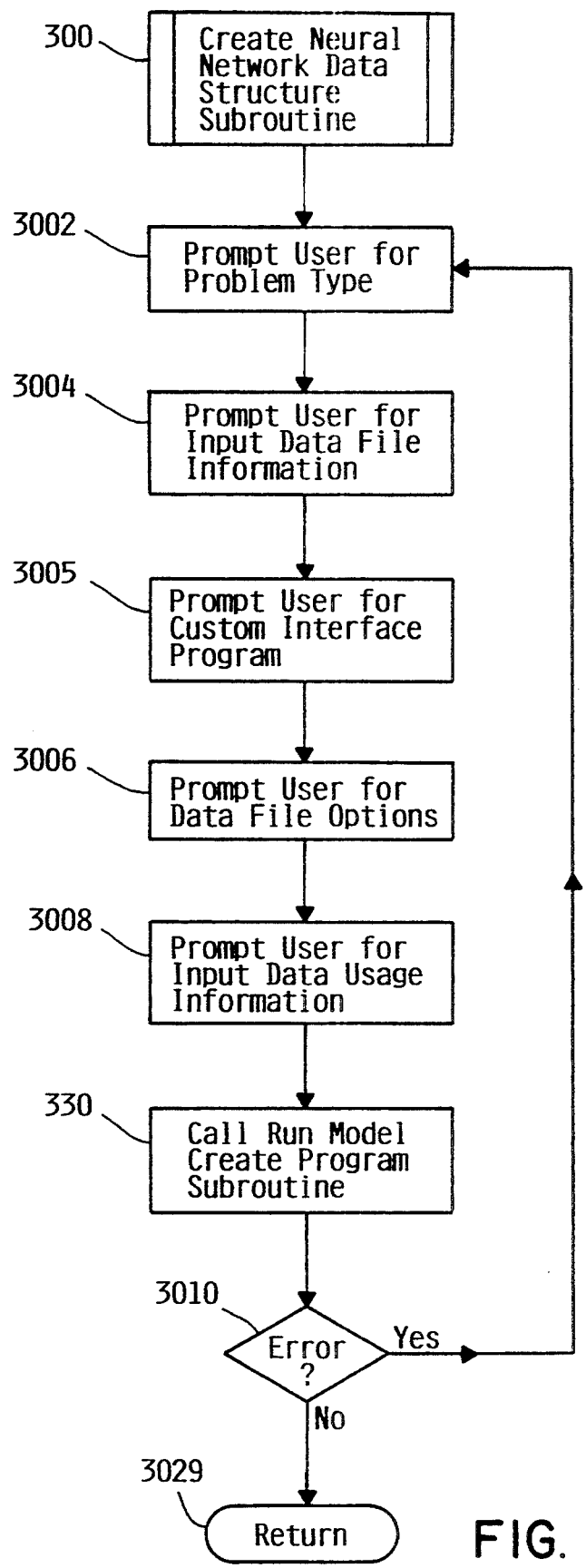
Figures 1, 7B:
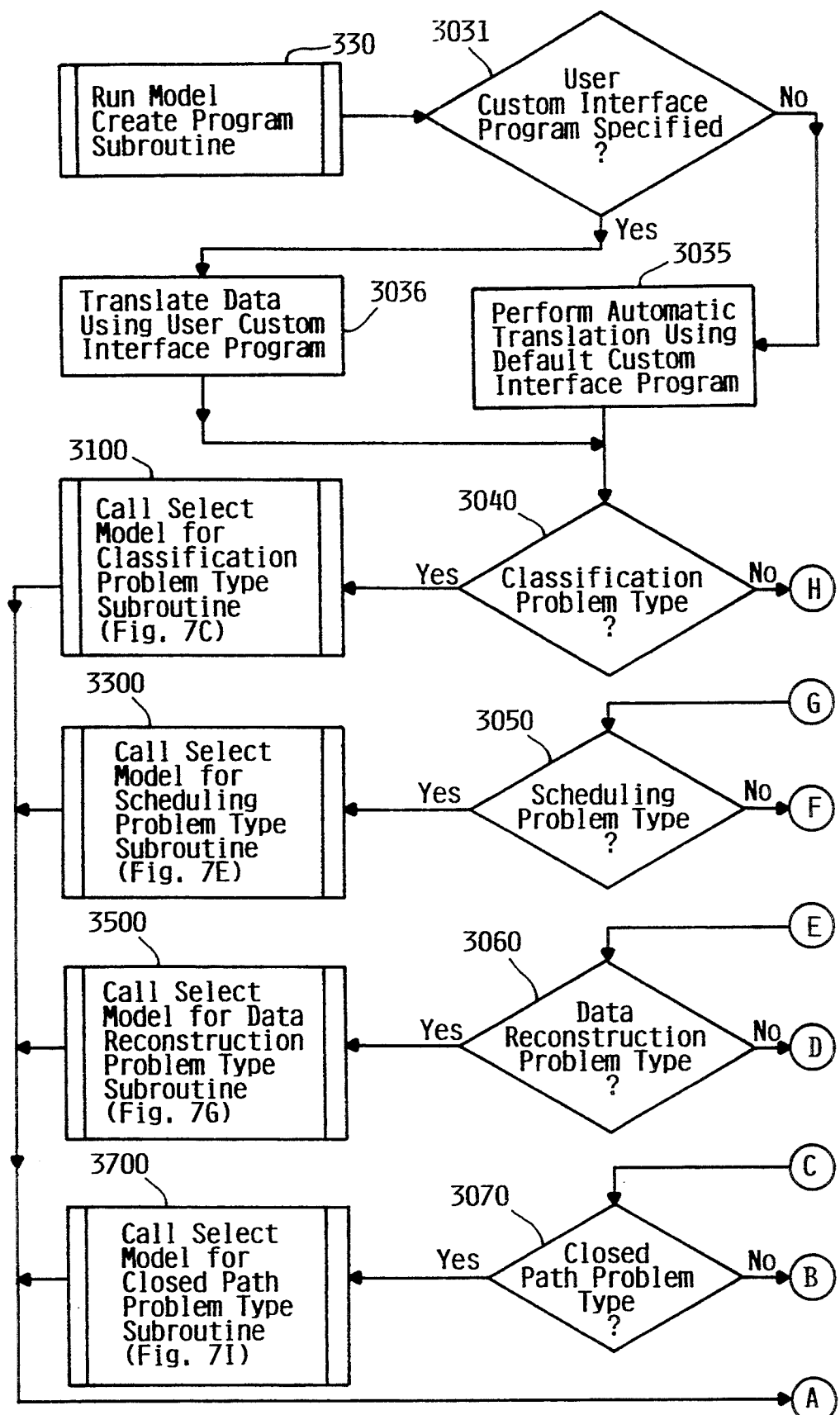
Figures 2, 7B:
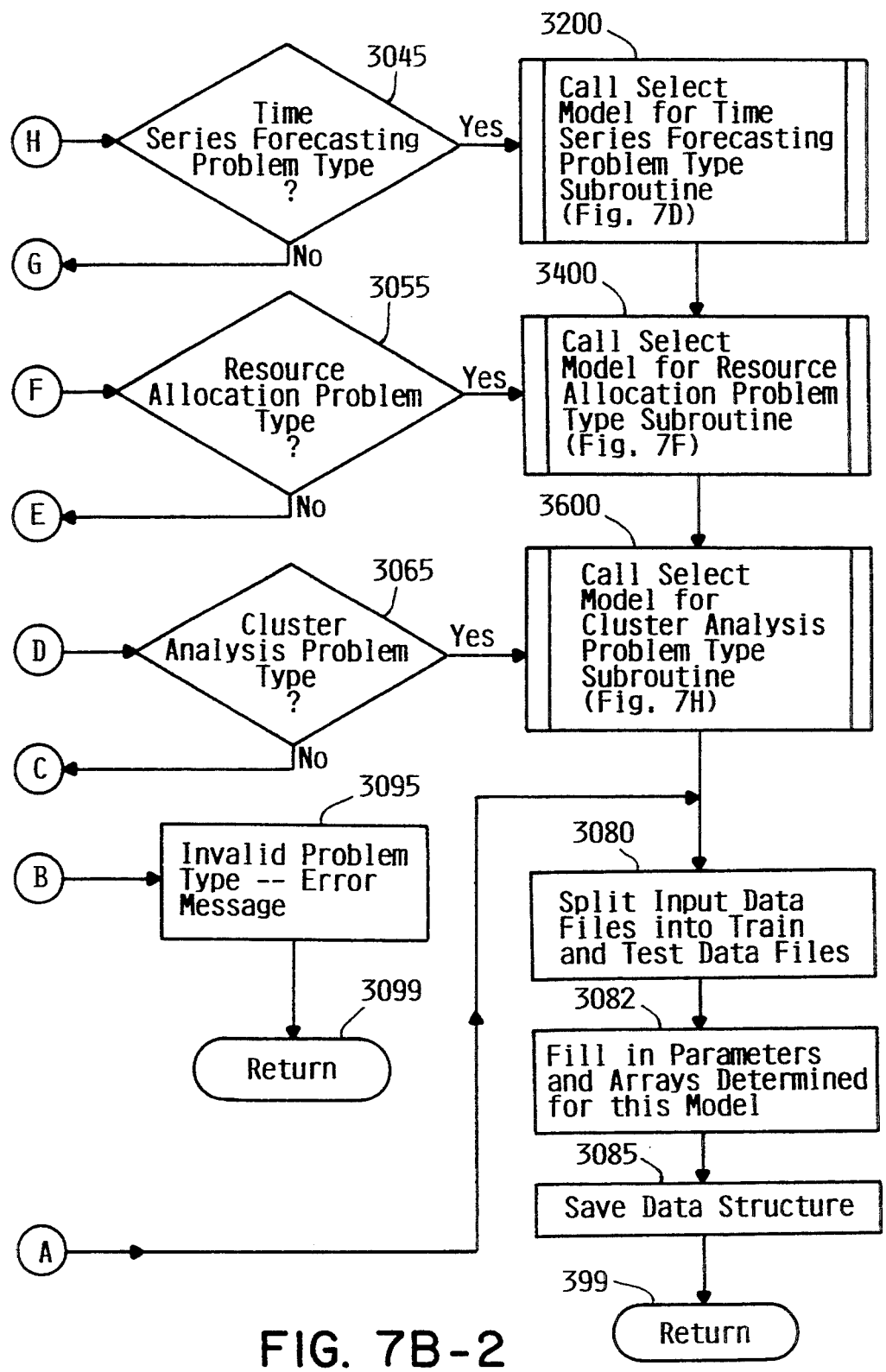
Figure 7C:
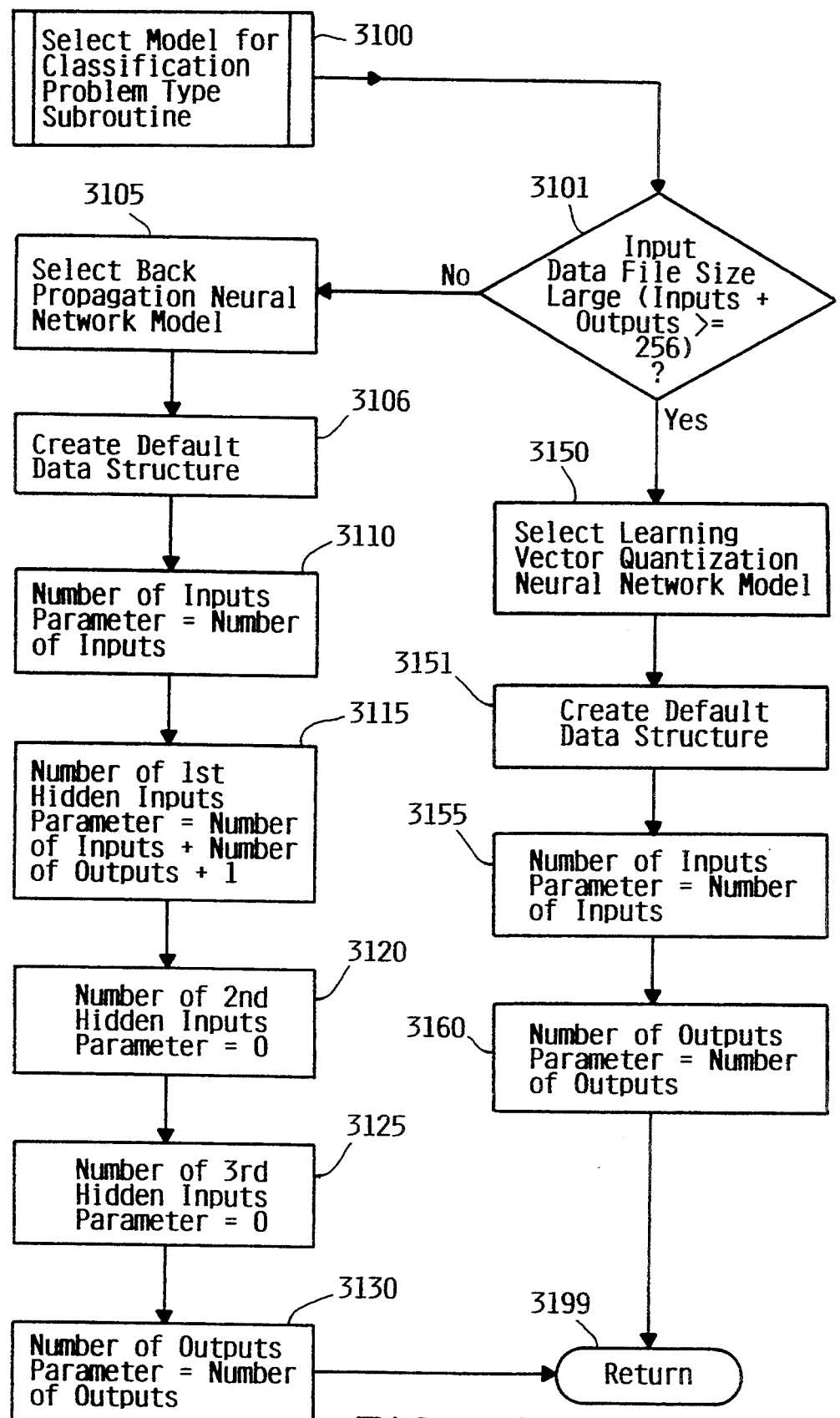
Figure 7D:
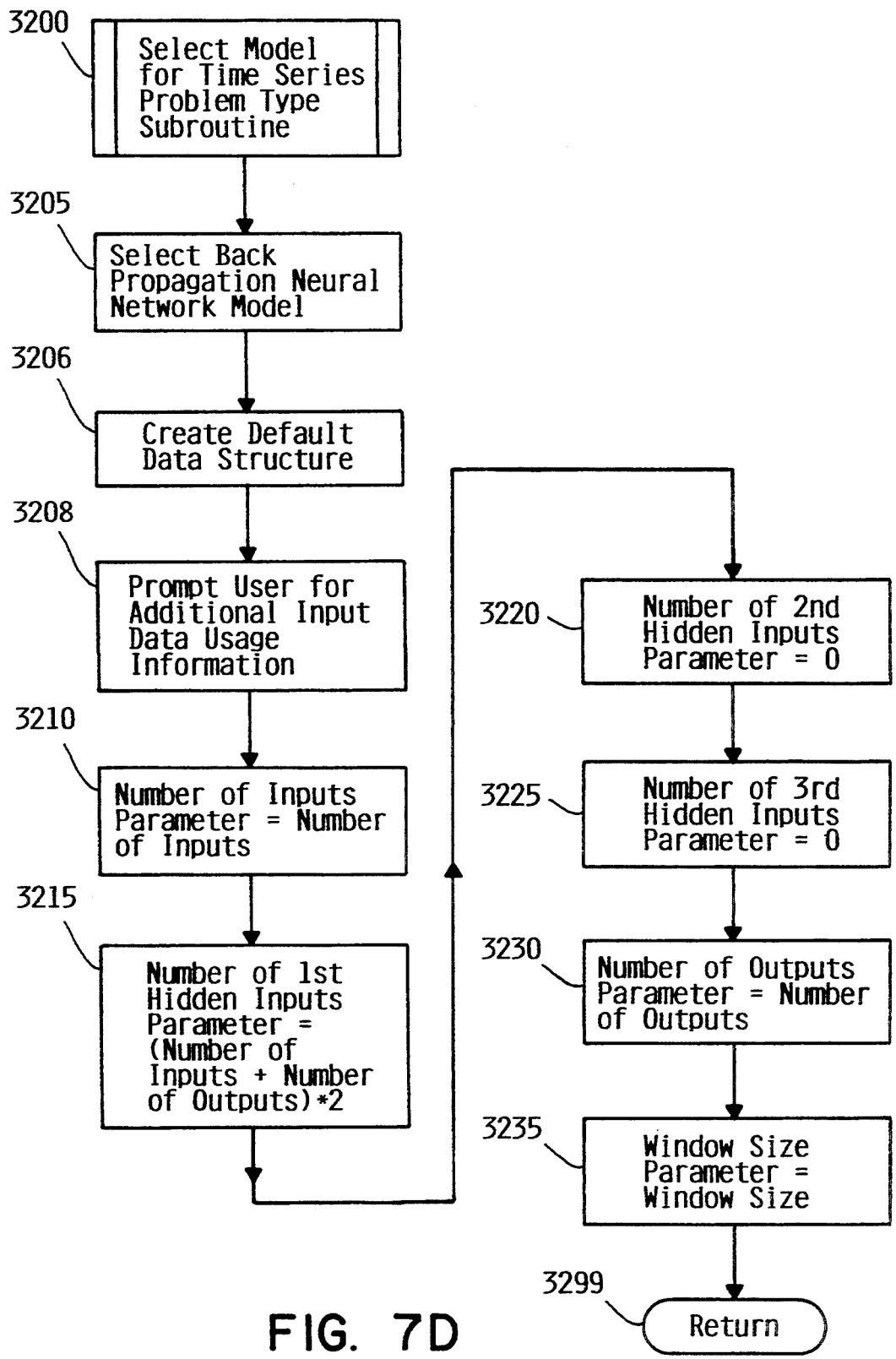
Figure 7E:
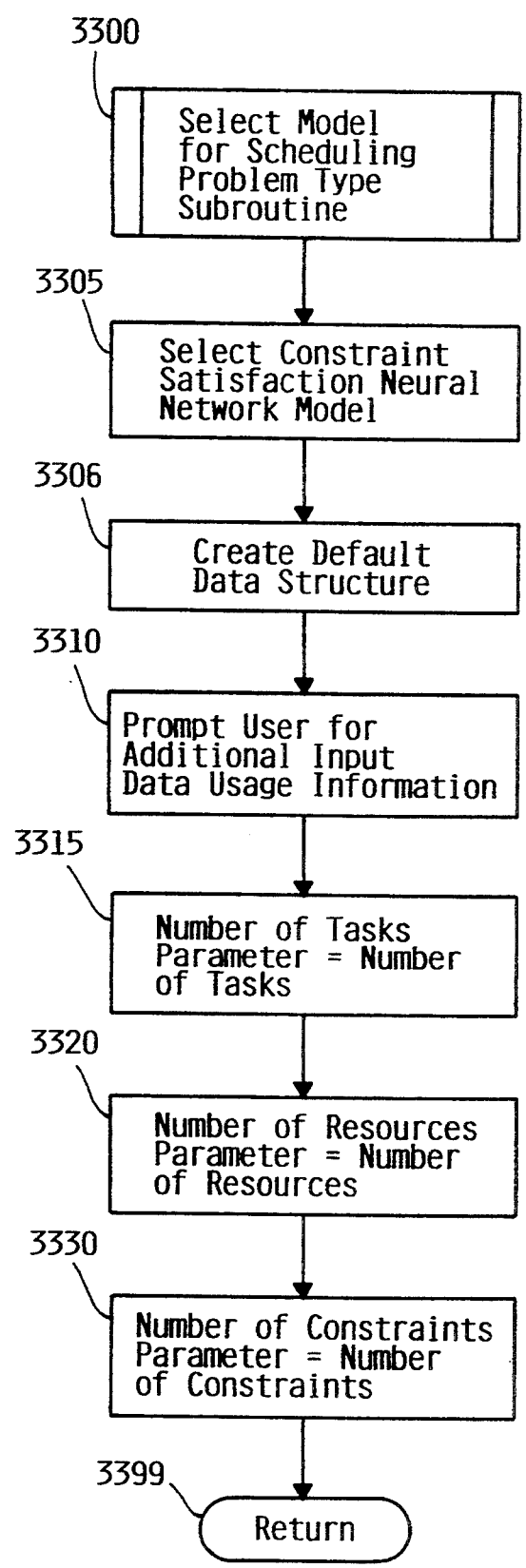
Figure 7F:
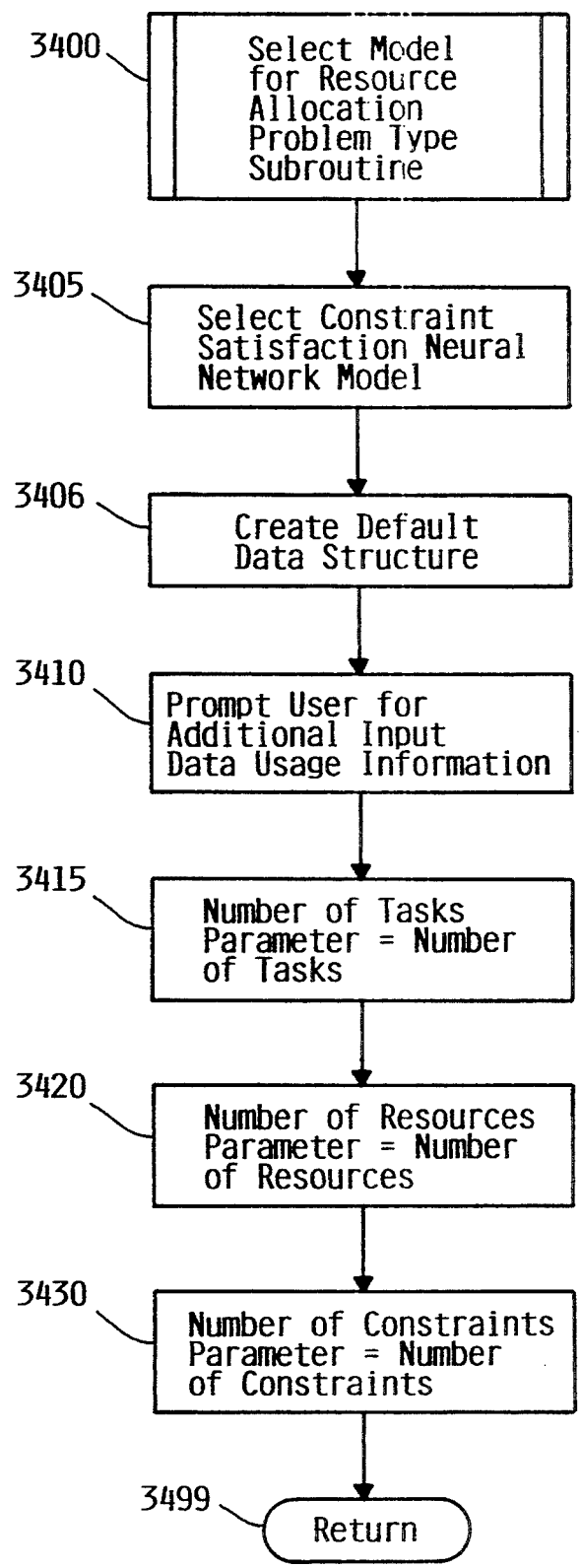
Figure 7G:
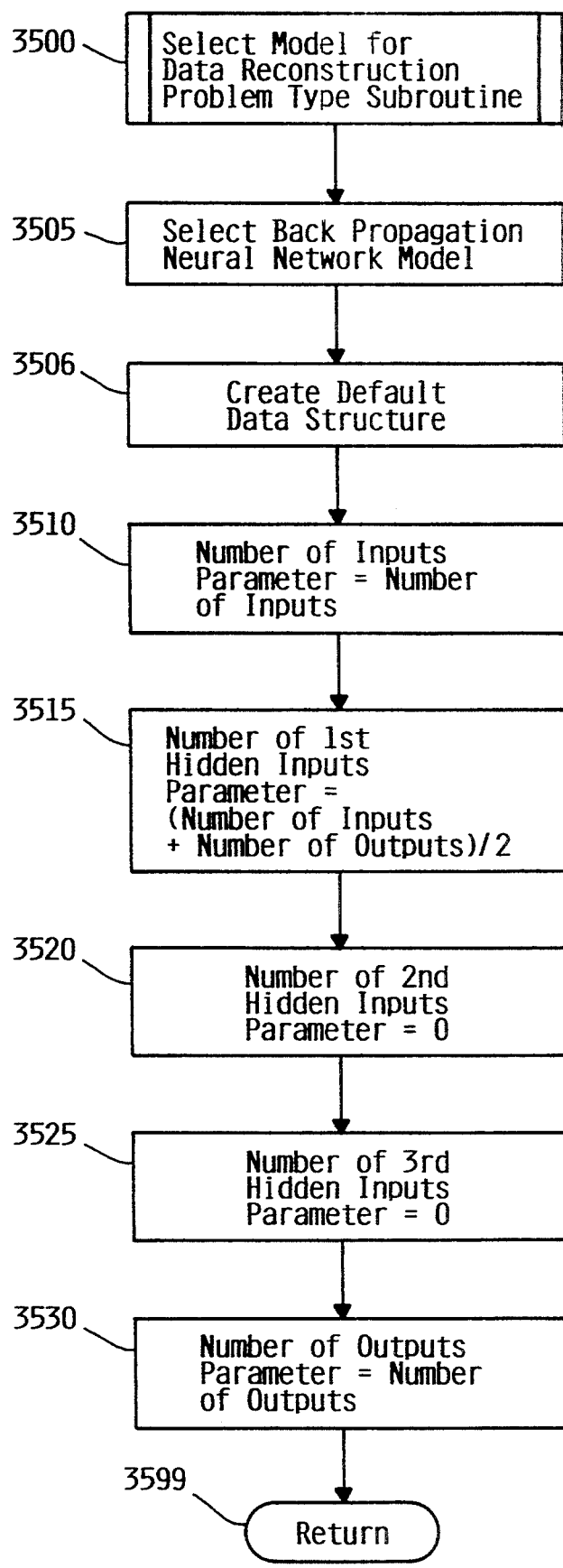
Figure 7H:
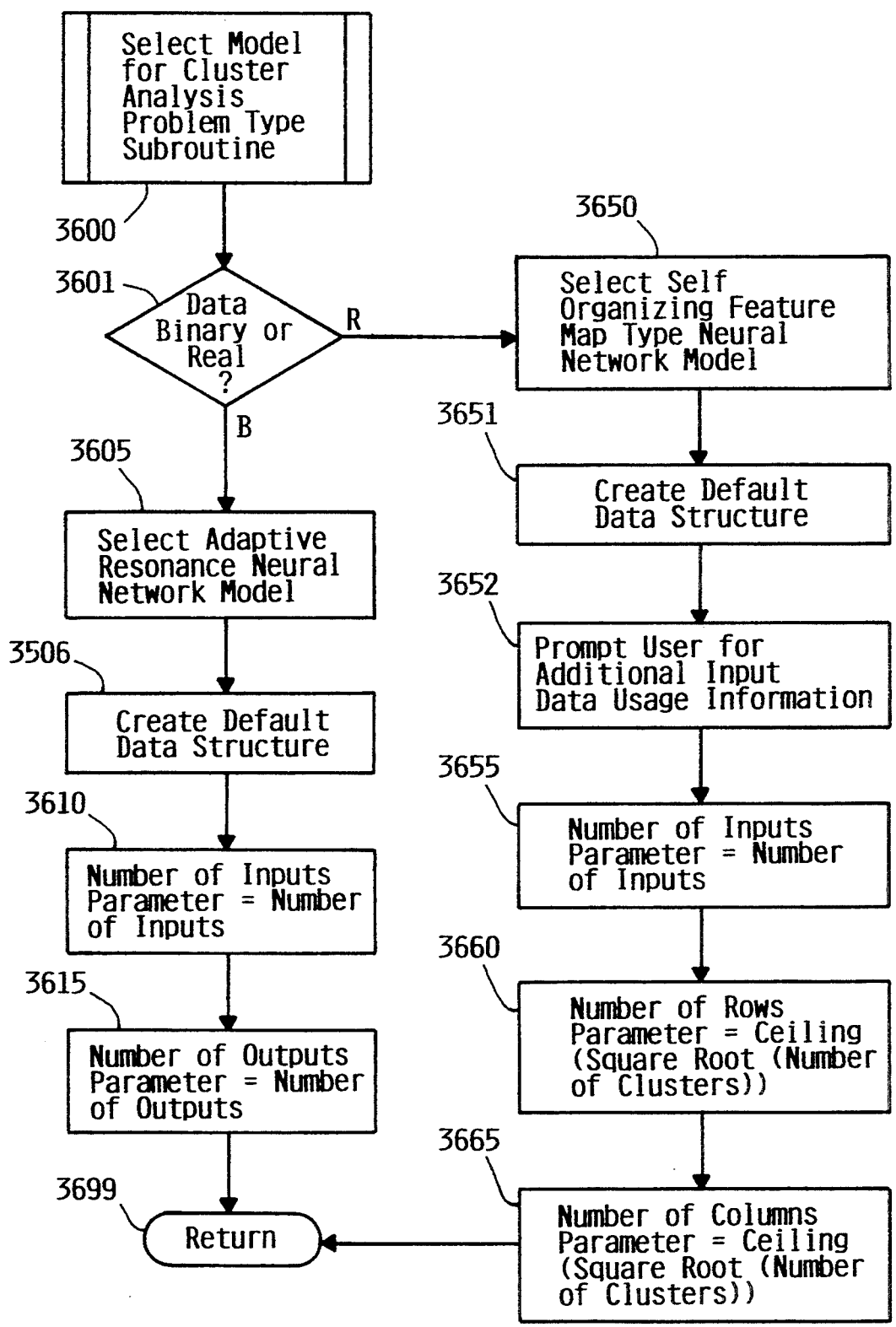
Figure 71:
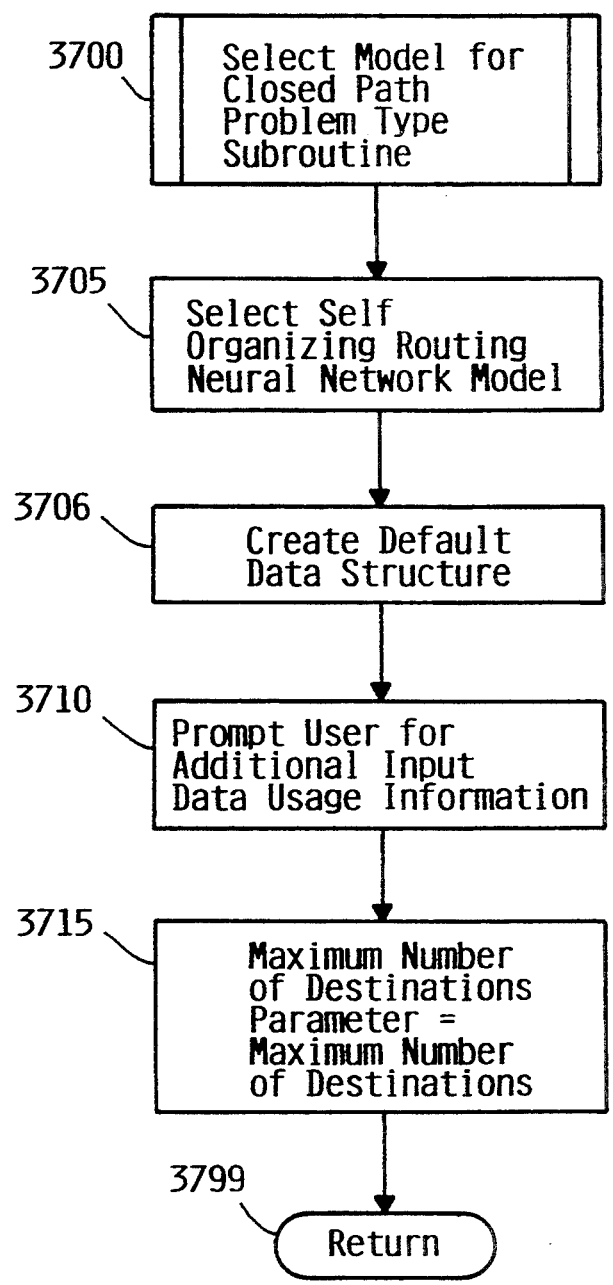
Figure 8A:
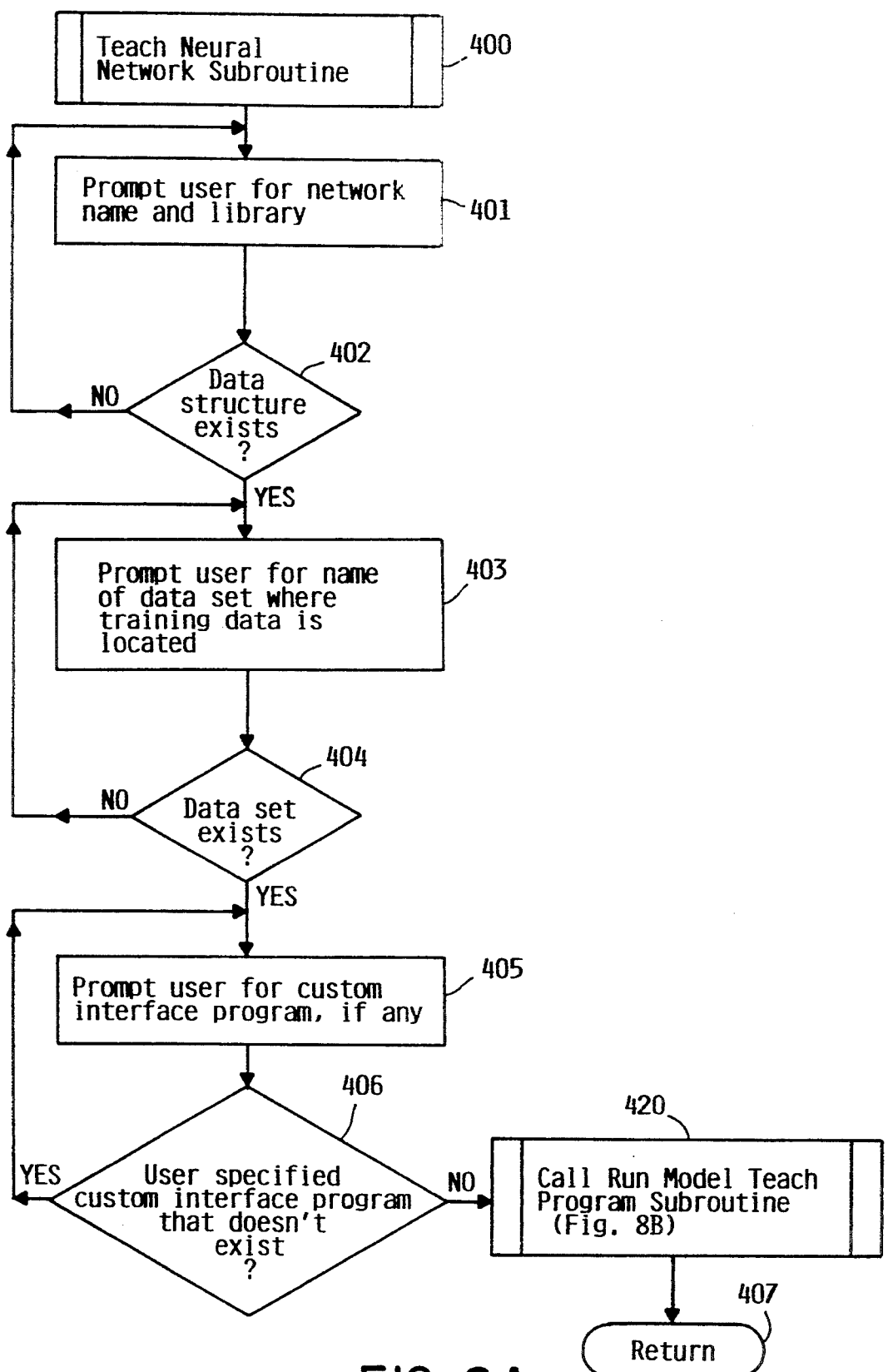
Figure 8B:
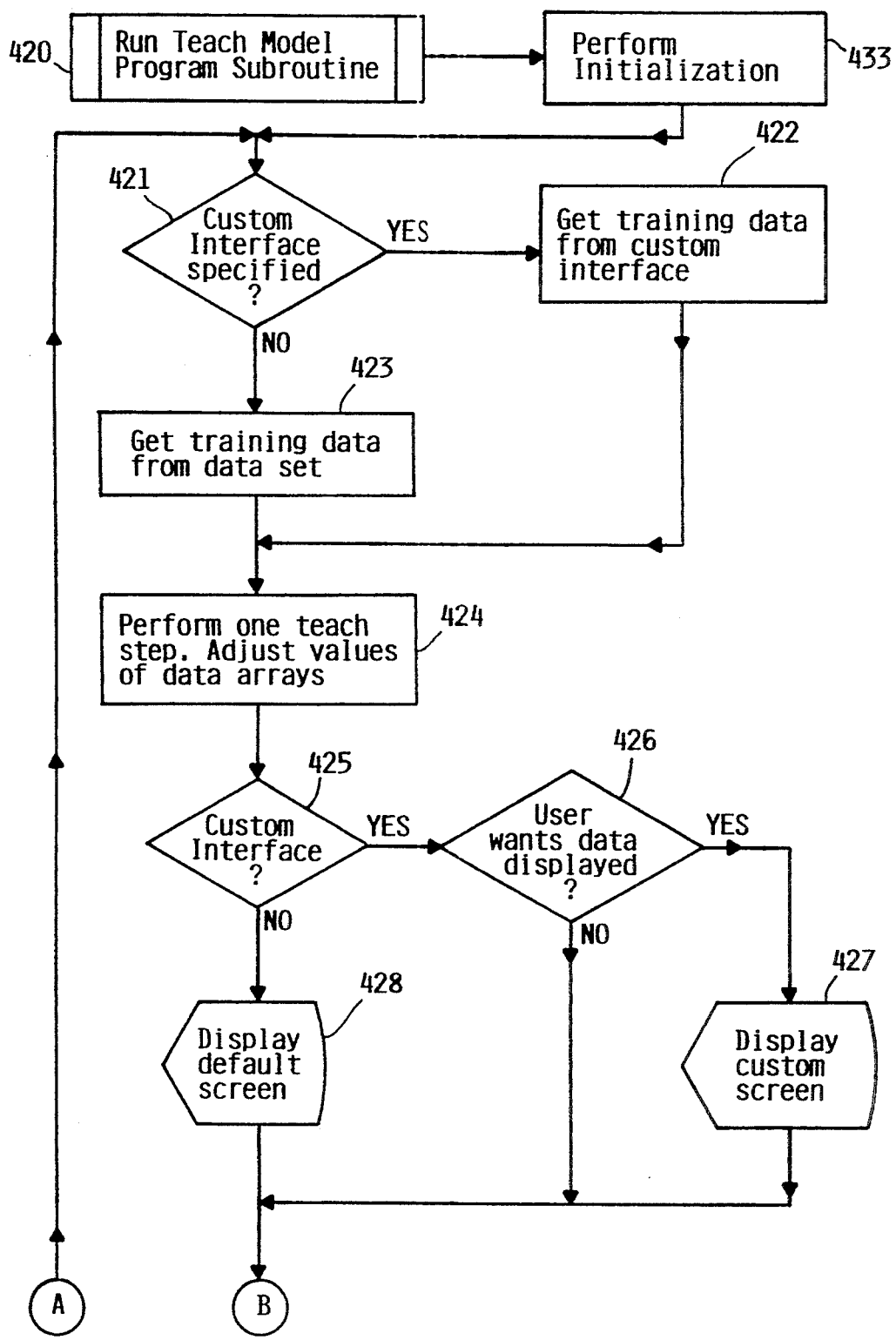
Figure 8C:
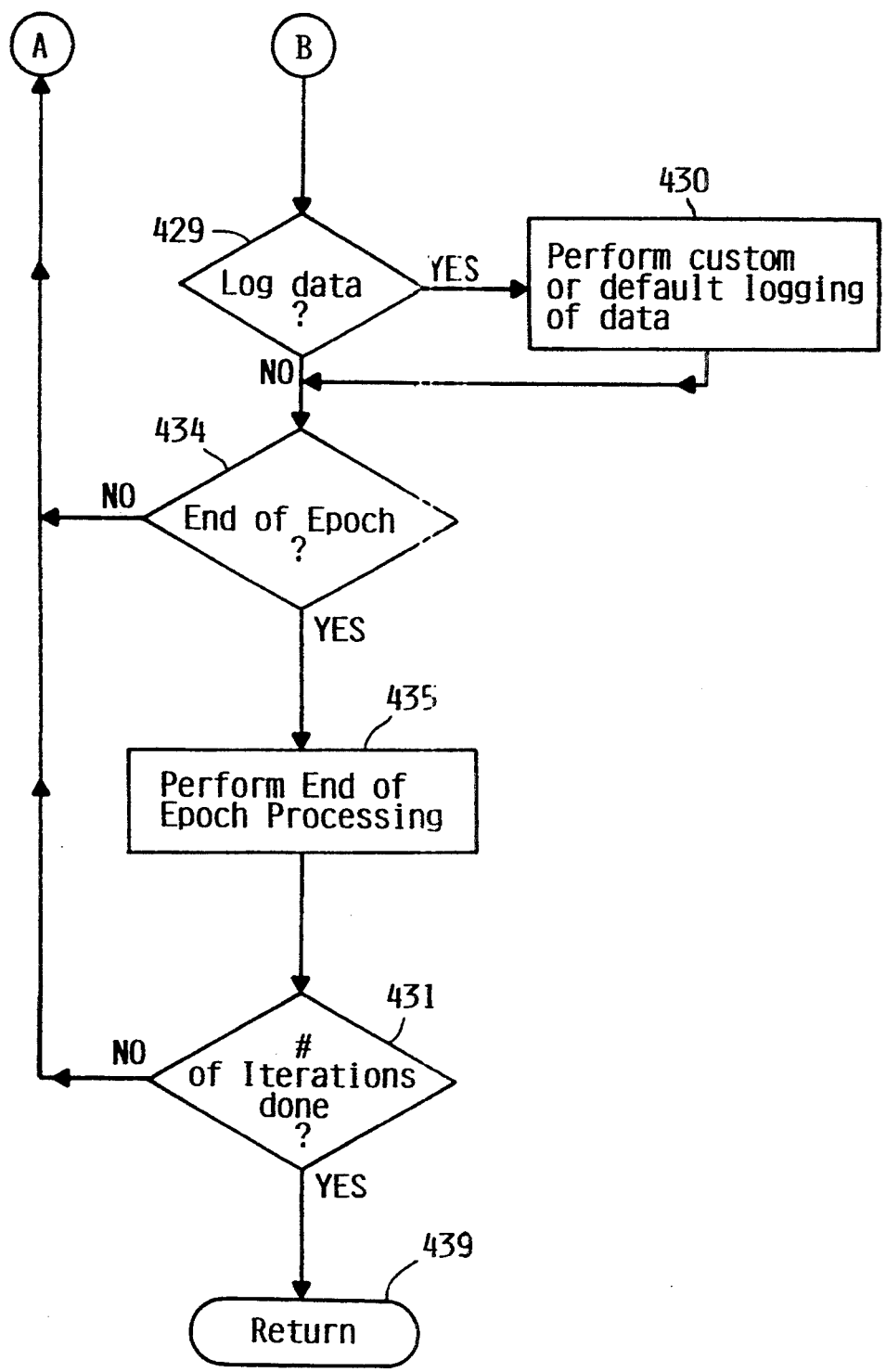

FIGS. 5-9B show the flowcharts of the invention, as performed by suitably programmed CPU 11 and/or co-processor 13. FIG. 5 shows an overview of the major steps in the neural network application program development process. Block 110 asks if there is a new neural network model to be defined. If so, block 200 calls the Define Neural Network Model Subroutine (FIG. 6). If not, block 120 asks if the user wishes to create a neural network data structure. A neural network data structure is created for each neural network. For example, one neural network data structure would be created for our coin identification neural network. If we also wanted to create another neural network to determine if an input number is odd or even, another neural network data structure would be created. If block 120 is answered affirmatively, block 300 calls the Create Neural Network Data Structure Subroutine (FIG. 7). If not, block 130 asks if the user wishes to train a neural network. A neural network needs to be trained with training data so that it can learn the relationship between input data and the desired output result, or extract relevant features from input data. If so, block 400 calls the Teach Neural Network Subroutine (FIG. 8). If not, block 140 asks if the user wants to run a neural network. If so, block 500 calls the Run Neural Network Model Subroutine (FIG. 9A). If not, the program ends in block 190.

FIGS. 6A-6D describes Define Neural Network Model Subroutine 200. This subroutine allows a user to define a custom-made neural network model. A detailed description on how this would be done can be found in Chapter 4 of the "Neural Network Utility/400: Programmer's Reference, (SC41-0032), hereinafter referred to as "Attachment II". Attachment II was unpublished as of the date of this patent application.

Block 207 defines a unique name for the model to be defined for field 79 of data structure 50. Block 208 defines the number of network parameters and network arrays that will be used for fields 81 and 82. Block 209 defines the parameters and arrays used for the specific neural network model and maps these parameters and arrays to parameters portion 85 and arrays portion 90 of data structure 50. Block 209 also calculates the size of parameters portion 85 for network parameters size field 83.

Figure 6A:
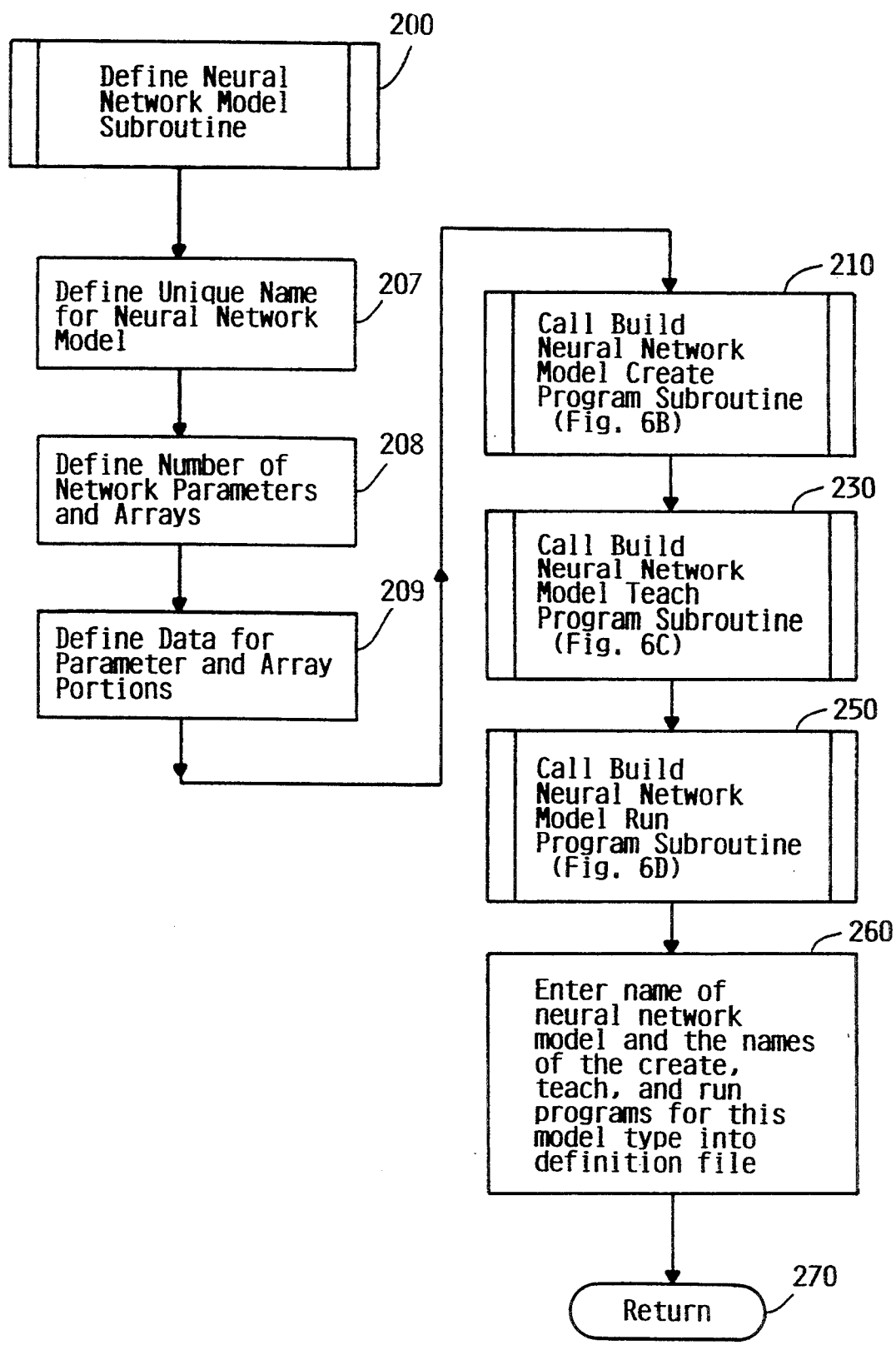
Figure 6B:
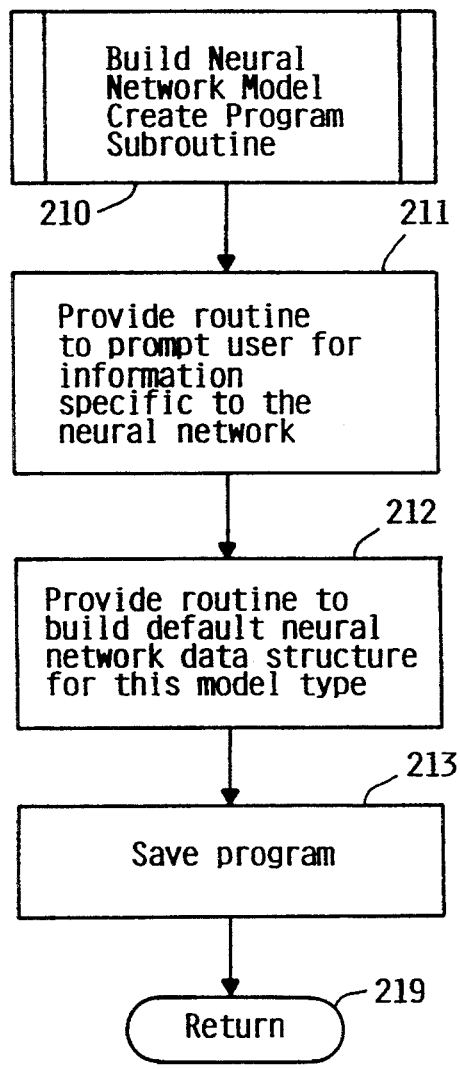

Block 210 calls the Build Neural Network Model Create Program Subroutine of FIG. 6B. Referring now to FIG. 6B, subroutine 210 allows for model specific routines to be built so that they can be executed later by the Create Neural Network Data Structure Subroutine (FIG. 7). Block 211 provides a simple routine to prompt the user for additional input data usage information specific to the neural network if necessary. For example, block 211 would provide a routine that would prepare screens, depending on the neural network model, similar to those shown in FIG. 12E-12G.

Block 212 provides a routine to initialize the generic neural network data structure with default parameter values to create the default neural network data structure for this neural network model. All neural network models have the same generic neural network data structure. Each individual neural network model has its own unique default data structure. Therefore, all neural networks application programs (coin identification, odd/even number identification, etc) that use the same neural network model (such as Back Propagation) will input unique parameter values into the same default neural network data structure.

Block 213 saves the neural network model create program built in subroutine 210 by giving it a unique name and writing it to storage 12 (FIG. 1). In the preferred embodiment, this program can be written in any language desired which has the capability to access the data structure. Block 219 returns to block 230 of FIG. 6A.

Figure 6C:
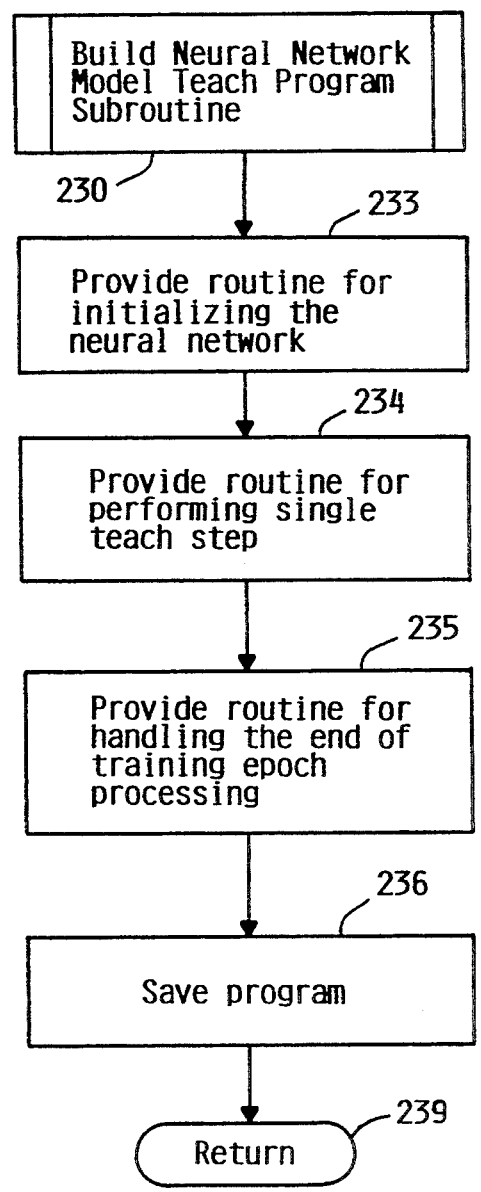

Block 230 calls the Build Neural Network Model Teach Program Subroutine of FIG. 6C. Referring now to FIG. 6C, subroutine 230 provides routines that can be executed later by the Teach Neural Network Subroutine (FIG. 8). Block 233 provides a routine to initialize the neural network. Block 233 initializes counters and variables used by the neural network teach program.

Block 234 provides a routine to perform a single teach step for this neural network model. This routine provides a mechanism, highly dependent on the neural network model, used to adjust the values of the data in the data array of body 90 so that the network can learn the desired functions. Those skilled in the art would take a neural network model description of its weight adjustment procedures (like those found in scholarly articles referenced in Attachment I) and simply convert this description to a program, using a computer language of their choice, that accesses the data structure of the invention.

Block 235 provides a routine to be performed when the training epoch processing has been completed. This routine can vary in complexity from a simple clean up procedure such as resetting variables to a more complex adjustment of data array values, depending on the neural network model. Those skilled in the art would take a neural network model description of its unique end of epoch processing and simply convert this description to a program, using a computer language of their choice, that accesses the data structure of the invention.

Block 236 saves the neural network model teach program built in subroutine 230 by giving it a unique name and writing it to storage 12 (FIG. 1). Block 239 returns to block 250 of FIG. 6A.

Figure 6D:
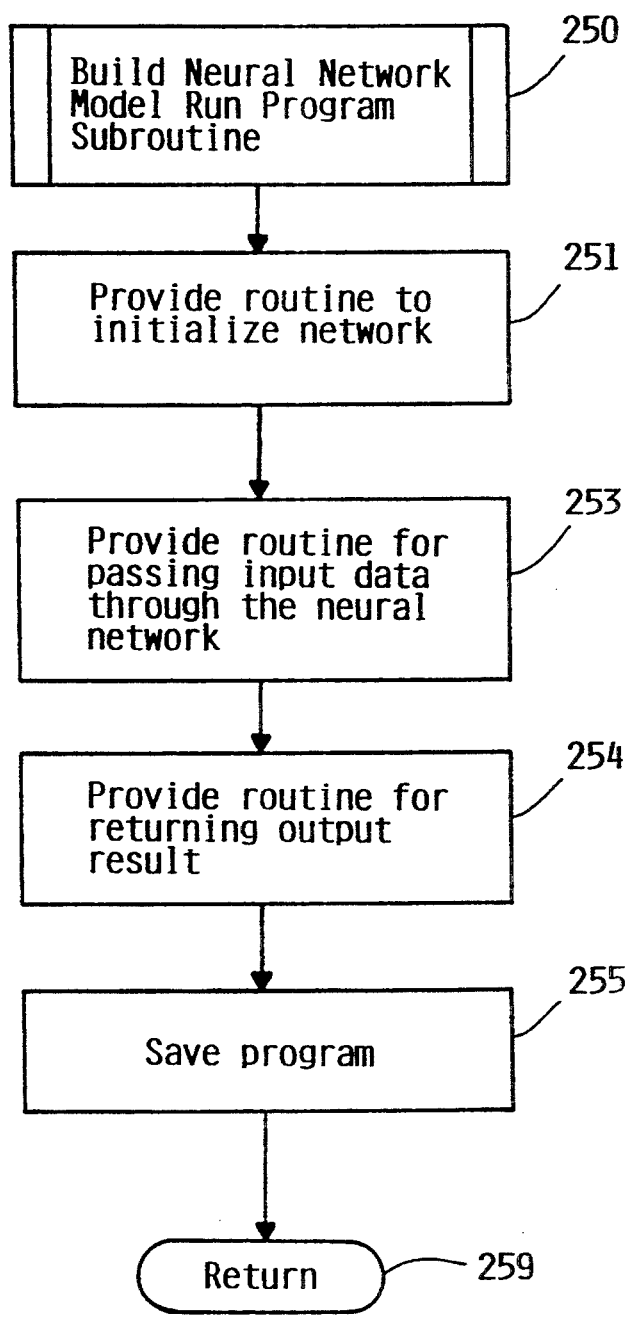

Block 250 calls the Build Neural Network Model Run Program Subroutine of FIG. 6D. Referring now to FIG. 6D, subroutine 250 provides routines that can be executed later by the Run Neural Network Subroutine (FIG. 8). Block 251 provides a simple routine to initialize the neural network. Block 253 provides a routine to pass input data through the neural network. Block 254 provides a routine to return the output result to the Run Neural Network Subroutine. Block 255 saves the neural network model run program built in subroutine 250 by giving it a unique name and writing it to storage 12 (FIG. 1). Block 259 returns to block 260 of FIG. 6A.

Block 260 enters the name of the neural network model (such as "*BKP" for back propagation) and the names of the create, teach, and run programs for this model saved in blocks 213, 236, and 255 into a model definition file stored in storage 12. Block 270 returns to block 120 of FIG. 5.

In the preferred embodiment, the following neural network models are predefined for the convenience of the application developer or user: Back Propagation, Constraint Satisfaction Network, Adaptive Resonance Theory, Self Organizing Feature Maps, and Self Organizing Routing Networks. Therefore, these models do not have to be defined by the user using the Define Neural Network Model Subroutine.

The remaining flowcharts will be discussed in conjunction with the exemplary coin identification neural network briefly discussed earlier. Let us assume that a user desires to create a neural network that determines if a coin is a penny, nickel, dime, or quarter based on input data that contains attribute information about the coin (whether it is copper or silver, whether the person is facing left or right, and whether there is a building, eagle, leaves, or a torch on the coin). The user creates this neural network by answering block 120 affirmatively in FIG. 5 and calling the Create Neural Network Data Structure Subroutine in block 300 (FIG. 7A).

Block 3002 prompts the user for the problem type, as shown in FIG. 11. The user is not required to have expertise about the different types of neural network models—he is simply asked, in non-technical language, to select the type of problem he wants solved. Chapter 6, Appendix A and Appendix B of Attachment I describes the problem types of FIG. 11 in more detail. Since our coin identification example is a classification problem (recognize a type of American coin based on its features), the user selects option 1.

Figures 10A, 10B:
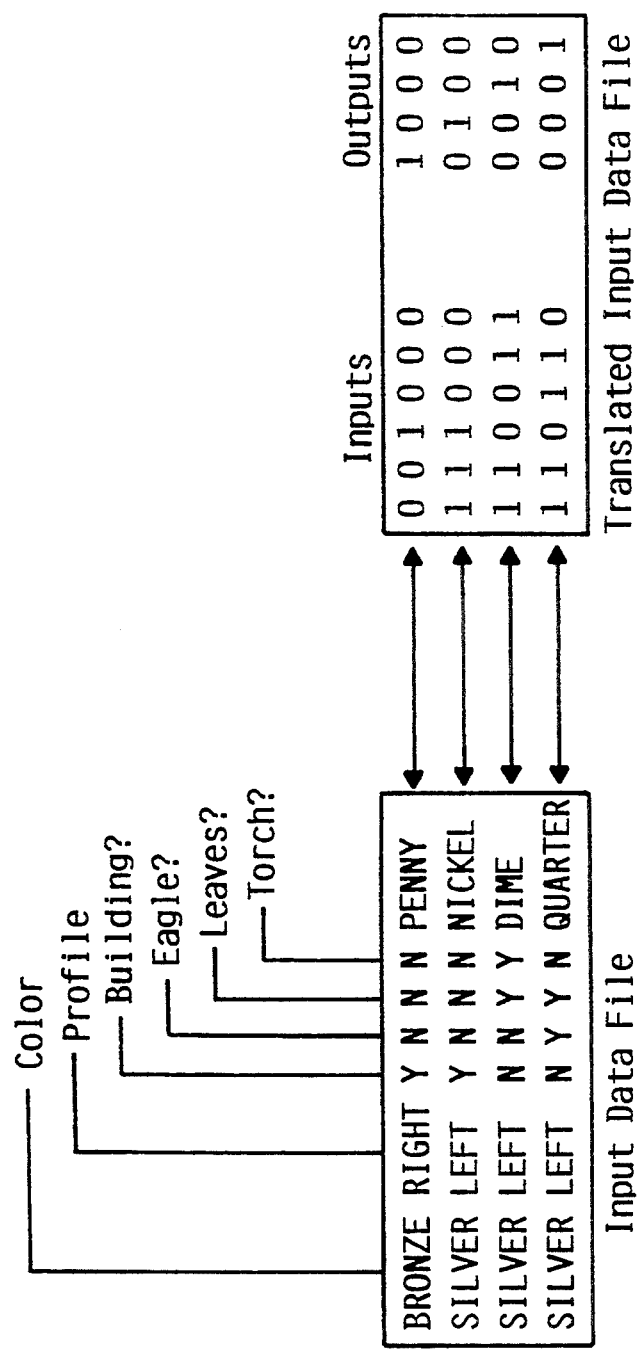
FIG. 10A shows an example of symbolic training data used in the invention.
FIG. 10B shows how the exemplary symbolic training data is converted to numeric training data.
Figure 12A:
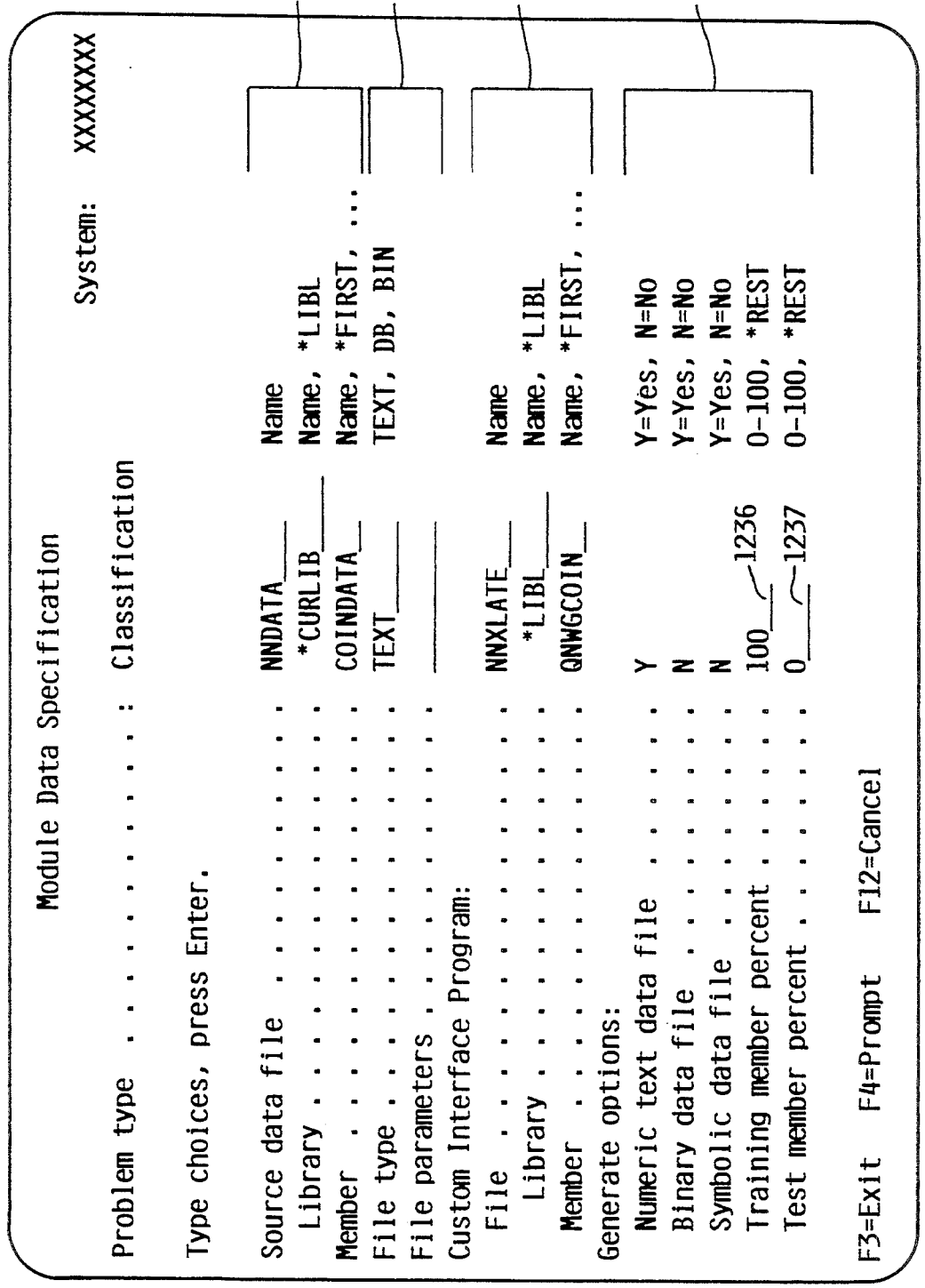

Block 3004 prompts the user for input data file information, as shown in field groups 1210 and 1220 in FIGS. 12A–12B. Input data file information includes the name, library and member of the input data file, along with the file type and any associated file parameters. Our coin example user enters "NNDATA, *CURLIB, and COINDATA" for the name, library, and member of the input data file. The contents of this example input data file is shown in FIG. 10A.

Our example file is an AS/400 text file, so our user types in TEXT and presses PF4 with the cursor on the file parameters field. This action causes FIG. 12B to be displayed as a pop up window, thereby prompting the user for the fields per record and the delimiter character used. Our example user enters in 7 for the number of fields per record (6 input fields and one output field) and specifies that a "blank" acts as a delimiter (i.e. separates fields from each other). In this manner, input data files constructed in a variety of formats using a variety of techniques, such as data from a spreadsheet or data base file, can all be successfully used by the neural network without requiring the user to restructure the data.

Block 3005 prompts the user for an optional user custom interface program in field group 1230 of FIG. 12A. If no user custom interface program is specified, a default custom interface program will perform any necessary translation. This default custom interface program is beyond the scope of this invention but is discussed in detail in US patent application "Apparatus and Method for Facilitating Use of a Neural Network", commonly assigned and filed on even date herewith. In our example, a user custom interface program is specified, and this program is used to convert the symbolic input data A file shown in FIG. 10A into the translated (numeric) input data file shown in FIG. 10B, by simply converting each input attribute into a "0" or "1" in a binary string. Note that the user custom interface program expands the single output field specified by the user to four binary output fields to represent the possible coins in our example.

Block 3006 prompts the user for data file options, as shown in field group 1240 in FIG. 12A. These data file options specify how the input data file can be preprocessed (by splitting it into up to two symbolic input data files, two numeric input data files and two binary input data files) prior to the completion of the translation operation performed by the custom interface program. If the user desires to split the input data file into a training file (used to train the neural network) and a test file (used after the training is completed and the network is locked to test how effective the training was), the percentage of the split is input in fields 1236 and 1237. For example, if the user desires to use 70% of his input data file as training data and 30% as test data, he enters 70 in field 1236 and 30 (or *rest) in field 1237. The user could also indicate that only a subset of the input data file will be used by indicating a percentage less than 100%.

In our example, the user has indicated that only a single numeric output file should be generated from the input data file by the custom interface program.

Block 3008 prompts the user for input data usage information, as shown in FIGS. 12C–12G. FIG. 12C shows how the user is asked to provide information as to whether a field in a input data file should be considered an input field, an output field, or ignored. For example, if the input data file is a spreadsheet, it may contain fields unrelated to the neural network processing. These are the types of fields that would be marked as "ignore". The user is also given an opportunity to provide more descriptive names for each of the fields. In our example, the user completes this screen in a manner shown in FIG. 12D.

Block 330 calls the Run Model Create Program Subroutine of FIG. 7B. Referring now to FIG. 7B, block 3031 checks to see if a user custom interface program was selected by the user. If not, block 3035 automatically translates the input data file using the default custom interface program in a manner discussed in detail in US patent application "Apparatus and Method for Facilitating Use of a Neural Network".

Since a user custom interface program was specified in our example, block 3031 is answered affirmatively and control moves to block 3036. Block 3036 runs the specified user custom interface program, thereby translating the input data file. In our example, block 3036 converts the input data file from the symbolic format shown in FIG. 10A to the numeric format shown in FIG. 10B.

Note that any fields in the input data file specified as "IGNORE" fields (FIG. 12C) are stripped off during the translate process. Since in our example none of our fields are "IGNORE" fields, none of them are stripped off during the translation process from FIG. 10A to FIG. 10B.

Block 3040 asks if this is a classification type problem. This is determined by analyzing the user's response to the screen shown in FIG. 11. If the user indicated that this was a classification type problem, the Select Model for Classification Problem Type Subroutine is called in block 3100.

If this is not a classification type problem, block 3045 asks if this is a time series forecasting type problem. If the user indicated that this was a time series forecasting type problem, the Select Model for Time Series Forecasting Problem Type Subroutine is called in block 3200.

If this is not a time series forecasting type problem, block 3050 asks if this is a scheduling type problem. If the user indicated that this was a scheduling type problem, the Select Model for Scheduling Problem Type Subroutine is called in block 3300.

If this is not a scheduling type problem, block 3055 asks if this is a resource allocation type problem. If the user indicated that this was a resource allocation type problem, the Select Model for Resource Allocation Problem Type Subroutine is called in block 3400.

If this is not a resource allocation type problem, block 3060 asks if this is a data reconstruction type problem. If the user indicated that this was a data reconstruction type problem, the Select Model for Data Reconstruction Problem Type Subroutine is called in block 3500.

If this is not a data reconstruction type problem, block 3065 asks if this is a cluster analysis type problem. If the user indicated that this was a cluster analysis type problem, the Select Model for Cluster Analysis Problem Type Subroutine is called in block 3600.

If this is not a cluster analysis type problem, block 3070 asks if this is a closed path type problem. If the user indicated that this was a closed path type problem, the Select Model for Closed Path Problem Type Subroutine is called in block 3700.

If none of these problem types have been indicated, the user input an incorrect value and an error message is displayed in block 3095. Flow of control returns back to block 3010 of FIG. 7A, which asks if an error occurred. Since an error did occur, flow goes back to block 3002 to again prompt the user for the information.

Referring again to FIG. 7B, if block 3040 indicates that the user selected a classification problem type, block 3100 calls the Select Model for Classification Problem Type Subroutine of FIG. 7C. Referring now to FIG. 7C, block 3101 checks the size of the input data file by asking if the data file contains a large number (exceeds a predetermined threshold of, for example, more than 256) input and output units.

If block 3101 determined that the data file does not contain a large number of input and output units, as is the case in our coin identification example, block 3105 selects the Back Propagation Neural Network Model as the best model for classification problems with a small number of input and output units. Block 3106 creates the default neural network data structure for this neural network model, by running the routine provided in block 212 of FIG. 6B. Block 3110 sets the Number of Inputs Parameter for this model to be equal to the number of input units present in the translated data input file. Note that the translation process performed by the custom interface program may save a different number of input units to be present in the translated data input file than the user specified in the screen shown in FIG. 12C. In our example, this value is six. Block 3115 sets the Number of 1st Hidden Inputs Parameter for this model to be equal to the number of inputs present in the translated data input file, plus the number of outputs present in the translated data input file, plus 1. In our example, this value is eleven (6+4+1). Block 3120 sets the Number of 2nd Hidden Inputs Parameter for this model to be zero, and block 3125 sets the Number of 3rd Hidden Inputs Parameter for this model to be zero. Block 3130 sets the Number of Outputs Parameter for this model to be equal to the number of outputs present in the translated data input file. In our example, this value is one. The architecture created for this neural network model in blocks 3110–3130 has been determined to be appropriate for this type of problem and this type of input data format. Other architectures for this model and subsequently discussed models could also be appropriate, as would be appreciated by those skilled in the art.

As can be seen from the above example, the appropriate neural network model and architecture have been automatically selected for the user, without requiring any specialized knowledge in neural network technology. The user is not required to understand the parameters specific to each neural network model, or even know that they exist. The user only needs to know, in non-technical terms, the type of problem he is trying to solve and some usage information about his input data, such as whether a field contains input data or output data. The subroutine returns in block 3199 to block 3080 of FIG. 7B.

The neural network data structure created for this model and subsequent models is considered to be "based" on the input data usage information specified by the user, since the user specified information is modifiable by the translation process to build the translated data file (which is used to determine the parameter values for the data structure). Description of the problem type in "non-technical terms" means terminology other than the name of a neural network model that adequately describes the problem type.

If block 3101 determined that the number of input and output units is large, block 3150 selects the Learning Vector Quantization Neural Network Model as the best model for classification problems with a large number of input and output units. Although not predefined in the preferred embodiment, this well known neural network model can be defined as discussed previously. Block 3151 creates the default neural network data structure for this neural network model, by running the routine provided in block 212 of FIG. 6B. Block 3155 sets the Number of Inputs Parameter for this model to be equal to the number of inputs present in the translated data input file. Block 3160 sets the Number of Outputs Parameter for this model to be equal to the number of outputs present in the translated data input file. The architecture created for this neural network model in blocks 3155 and 3160 has been determined to be appropriate for this type of problem and this type of input data format. The subroutine returns in block 3199 to block 3080 of FIG. 7B.

Referring again to FIG. 7B, if block 3045 indicates that the user selected a time series forecasting problem type, block 3200 calls the Select Model for Time Series Forecasting Problem Type Subroutine of FIG. 7D. Referring now to FIG. 7D, block 3205 selects the Back Propagation Neural Network Model as the best model for time series forecasting problems. Block 3206 creates the default neural network data structure for this neural network model, by running the routine provided in block 212 of FIG. 6B. Since additional input data usage information is required for time series forecasting problems, block 3208 prompts the user for this additional information, as shown in the screen of FIG. 12E-1. The additional information needed is "window size". The user indicates the size of the sliding window of data used to set the time period for the time series forecasting. For example, if the input data contains the closing Dow Jones Industrial Average for each day and it is desirable to teach the neural network to learn how to predict how this average fluctuates on a weekly basis, the user would set the window size to be five (for each weekday). Block 3210 sets the Number of Inputs Parameter for this model to be equal to the number of inputs present in the translated data input file. Block 3215 sets the Number of 1st Hidden Inputs Parameter for this model to be equal to the number of inputs present in the translated data input file, plus the number of outputs present in the translated data input file, plus 1. Block 3220 sets the Number of 2nd Hidden Inputs Parameter for this model to be zero, and block 3225 sets the Number of 3rd Hidden Inputs Parameter for this model to be zero. Block 3230 sets the Number of Outputs Parameter for this model to be equal to the number of outputs present in the translated data input file. Block 3235 sets the Window Size Parameter for this model to be equal to the window size specified by the user in the screen shown in FIG. 12E-1. The architecture created for this neural network model in blocks 3210-3235 has been determined to be appropriate for this type of problem and this type of input data format. The subroutine returns in block 3299 to block 3080 of FIG. 7B.

Referring again to FIG. 7B, if block 3050 indicates that the user selected a scheduling problem type, block 3300 calls the Select Model for Scheduling Problem Type Subroutine of FIG. 7E. Referring now to FIG. 7E, block 3305 selects the Constraint Satisfaction Neural Network Model as the best model for scheduling problems. Block 3306 creates the default neural network data structure for this neural network model, by running the routine provided in block 212 of FIG. 6B. Since additional input data usage information is required for scheduling problems, block 3310 prompts the user for this additional information, as shown in the screens of FIG. 12F-12H. The user's additional information is processed by block 3310 to provide a "number of tasks", "number of resources", and "number of constraints" in a manner discussed in more detail in Chapter 4 of Attachment I.

Block 3315 sets the Number of Tasks Parameter for this model to be equal to the number of tasks the user specified in the screen shown in FIG. 12F. Block 3320 sets the Number of Resources Parameter for this model to be equal to the number of resources the user specified in the screen shown in FIG. 12F. Block 3330 sets the Number of Constraints Parameter for this model to be equal to the number of constraints the user specified in the screen shown in FIG. 12H. The architecture created for this neural network model in blocks 3315-3330 has been determined to be appropriate for this type of problem and this type of input data format. The subroutine returns in block 3399 to block 3080 of FIG. 7B.

Referring again to FIG. 7B, if block 3055 indicates that the user selected a resource allocation problem type, block 3400 calls the Select Model for Resource Allocation Problem Type Subroutine of FIG. 7F. Referring now to FIG. 7F, block 3405 selects the Constraint Satisfaction Neural Network Model as the best model for resource allocation problems. Block 3406 creates the default neural network data structure for this neural network model, by running the routine provided in block 212 of FIG. 6B. Since additional input data usage information is required for resource allocation problems, block 3410 prompts the user for this additional information, as shown in the screens of FIG. 12F-12H. The user's additional information is processed by block 3310 to provide a "number of tasks" "number of resources", and "number of constraints", as has already been discussed. Block 3415 sets the Number of Tasks Parameter for this model to be equal to the number of tasks the user specified in the screen shown in FIG. 12F. Block 3420 sets the Number of Resources Parameter for this model to be equal to the number of resources the user specified in the screen shown in FIG. 12F. Block 3430 sets the Number of Constraints Parameter for this model to be equal to the number of constraints the user specified in the screen shown in FIG. 12H. The architecture created for this neural network model in blocks 3415-3430 has been determined to be appropriate for this type of problem and this type of input data format. The subroutine returns in block 3499 to block 3080 of FIG. 7B.

Referring again to FIG. 7B, if block 3060 indicates that the user selected a data reconstruction problem type, block 3500 calls the Select Model for Data Reconstruction Problem Type Subroutine of FIG. 7G. Referring now to FIG. 7G, block 3505 selects the Back Propagation Neural Network Model as the best model for data reconstruction problems with binary input data. Block 3506 creates the default neural network data structure for this neural network model, by running the routine provided in block 212 of FIG. 6B. Block 3510 sets the Number of Inputs Parameter for this model to be equal to the number of inputs present in the translated data input file. Block 3515 sets the Number of 1st Hidden Inputs Parameter for this model to be equal to the number of inputs present in the translated data input file, plus the number of outputs present in the translated data input file, divided by two. If the result is a fractional value, it is rounded up to the nearest integer (e.g. 2.1 becomes 3). Block 3520 sets the Number of 2nd Hidden Inputs Parameter for this model to be zero, and block 3525 sets the Number of 3rd Hidden Inputs Parameter for this model to be zero. Block 3530 sets the Number of Outputs Parameter for this model to be equal to the number of outputs present in the translated data input file. The architecture created for this neural network model in blocks 3510-3530 has been determined to be appropriate for this type of problem and this type of input data format. The subroutine returns in block 3599 to block 3080 of FIG. 7B.

Referring again to FIG. 7B, if block 3065 indicates that the user selected a cluster analysis problem type, block 3600 calls the Select Model for Cluster Analysis Problem Type Subroutine of FIG. 7H. Referring now to FIG. 7H, block 3601 asks if the data in the input data file is in binary or real format.

Data in the input data file is binary if all of the data is either a "0" or a "1". Data in the input data file is real if some of the data is fractional values between 0 and 1, such as "0.25". Block 3101 scans the input data file looking for a field containing real valued data. If none is found (i.e. all fields contain binary data), then the input data format is "binary". Otherwise, the input data format is "real".

If block 3601 determined that the data in the input data file is binary, block 3605 selects the Adaptive Resonance Neural Network Model as the best model for cluster analysis problems with binary input data. Block 3600 creates the default neural network data structure for this neural network model, by running the routine provided in block 212 of FIG. 6B. Block 3610 sets the Number of Inputs Parameter for this model to be equal to the number of inputs present in the translated data input file. Block 3615 sets the Number of Outputs Parameter for this model to be equal to the number of outputs present in the translated data input file. The architecture created for this neural network model in blocks 3610–3615 has been determined to be appropriate for this type of problem and this type of input data format. The subroutine returns in block 3699 to block 3080 of FIG. 7B.

If block 3601 determined that the data in the input data file is real, block 3650 selects the Self Organizing Feature Map Neural Network Model as the best model for cluster analysis problems with real valued input data. Block 3651 creates the default neural network data structure for this neural network model, by running the routine provided in block 212 of FIG. 6B. Since additional input data usage information is required for cluster analysis problems, block 3652 prompts the user for this additional information, as shown in the screen of FIG. 12E-2. The additional information needed is "number of clusters". Block 3655 sets the Number of Inputs Parameter for this model to be equal to the number of inputs present in the translated data input file. Block 3660 sets the Number of Rows Parameter for this model to be equal to the ceiling (number rounded up to the nearest integer) of the square root of the number of clusters specified by the user in FIG. 12E-2. Block 3665 sets the Number of Columns Parameter for this model to be equal to the ceiling of the square root of the number of clusters specified by the user in FIG. 12E-2. The architecture created for this neural network model in blocks 3655 to 3665 has been determined to be appropriate for this type of problem and this type of input data format. The subroutine returns in block 3699 to block 3080 of FIG. 7B.

Referring again to FIG. 7B, if block 3070 indicates that the user selected a closed path problem type, block 3700 calls the Select Model for Closed Path Problem Type Subroutine of FIG. 7I. Referring now to FIG. 7I, block 3705 selects the Self Organizing Routing Neural Network Model as the best model for closed path problems. Block 3706 creates the default neural network data structure for this neural network model, by running the routine provided in block 212 of FIG. 6B. Since additional input data usage information is required for closed path problems, block 3710 prompts the user for this additional information, as shown in the screen of FIG. 12E-3. The additional information needed is "maximum number of destinations". Block 3715 sets the Maximum Number of Destinations Parameter for this model to be equal to the maximum number of destinations the user specified in the screen shown in FIG. 12E-3. The architecture created for this neural network model in block 3715 has been determined to be appropriate for this type of problem and this type of input data format. The subroutine returns in block 3799 to block 3080 of FIG. 7B.

Referring again to FIG. 7B, when subroutines 3100–3700 return, they all go to block 3080. Block 3080 splits the input data file (or files) into a training input data file (or files) and a test input data file (or files) in the ratio specified by the user in FIG. 12A. In our example, the user specified that 100% of the input file should be used for training data. Therefore, the entire input file is used as a training input data file. Block 3081 fills in the parameters and arrays determined for the selected neural network model into the default neural network data structure.

After block 3081 is executed, our example neural network data structure contains all the information needed to teach the neural network how to identify coins from input data describing their attributes (or any other network having six inputs and four outputs). Block 3085 assigns a file name to the data structure and saves it in storage 12 (FIG. 1). The subroutine returns in block 339 to block 305 in FIG. 7A. Block 305 returns to block 130 in FIG. 5.

Note that once a neural network data structure has been created, it can be transported to another computer system to be taught and/or run. The other computer system can be of an entirely different architecture and run an entirely different operating system than the computer system that created the neural network data structure. This flexibility is possible since the data structure contains data that can be used universally among different computer systems.

Since our user wants to train his newly created neural network to identify coins, he answers block 130 affirmatively in FIG. 5, thereby calling the Teach Neural Network Subroutine in block 400 (FIG. 8). Referring now to FIG. 8A, block 401 prompts the user for the name of the neural network and library as shown in FIG. 14. The user enters "COINNET" as the name of the neural network, "*CURLIB" as the library name. FIG. 14 also gives the user the opportunity to enter in the name of a user custom interface program he can write to improve the usability of his particular neural network, if desired. In addition, the user is asked if he wants the training results to be logged or displayed, and (if a custom interface program exists) whether he wants the training data taken automatically from the data set or one step at a time from the user when he presses the enter key. Block 402 sees if the data structure specified in block 401 exists. If not, an error is posted and the user is returned to block 401. If so, block 403 prompts the user for the name of the data set where the training data is located, As shown in FIG. 13, the user enters "QANWCOIN" as the data set and "COINDEMO" as the data set member where the training data is located.

FIG. 10A shows the training data used in our example. Note that the data is stored in a symbolic (readable) format to improve usability and support a defined data base format, such as SQL or dBaseIII. Block 404 determines that the data set exists, so block 405 prompts the user for the name of the custom interface program, if any. If symbolic data is stored in the data set, a user specified custom interface program is needed to convert symbolic data (that humans understand) into numeric data (that neural networks understand). In our example, a custom interface program was specified in FIG. 13 (QNWGCOIN) and this program converted the symbolic training data shown in FIG. 10A into the numeric training input data file shown in FIG. 10B by simply converting each input attribute into a "0" or a "1" in a binary string. A four position binary number represents the four possible output states in our example. If a custom interface program was specified but did not exist, block 406 is answered positively and flow of control goes back to block 405. Otherwise, block 420 calls the Run Model Teach Program Subroutine for this model of FIG. 8B. The Model Teach Program was prepared by the Build Model Teach Program Subroutine of FIG. 6C, as has been discussed.

Referring now to FIG. 8B, block 433 performs the initialization routine built by block 233 of FIG. 6C. Block 421 checks to see if a custom interface program was specified. If so, as is the case in our example, block 422 gets the data from the custom interface program (numeric data shown in FIG. 10B). Otherwise, the training data is stored in numeric format in the data set and block 423 gets the data directly from the data set. Block 424 performs one teach step by running the neural network model dependent routine provided by block 234 of FIG. 6C. In our example, the values of the data in the data arrays in body 90 are adjusted to minimize the error between the desired and actual network outputs. Block 425 again checks for a custom interface program. If it exists, block 426 checks to see if the user wants the values of the data in the data structure to be displayed. If so, a custom screen generated by the custom interface program is displayed in block 427. Example custom screen are shown in FIGS. 19A–19D. If no custom interface program exists but the user wants data displayed, a default screen is displayed in block 428. An example default screen is shown in FIG. 15.

Referring again to FIG. 8B, block 429 checks to see if the user wanted the data logged. If so, block 430 performs custom or default logging of data. In either event, block 434 checks to See if one epoch has been completed. An epoch is complete when all training data in the data set has been processed once. If not, control loops back to block 421 to get the next training data. If one epoch has been completed, block 435 performs the end of epoch processing routine built by block 235 in FIG. 6C.

Block 431 then checks to see if the number of iterations specified by the user has been completed. Until this happens, block 431 is answered negatively and flow returns back to block 421 to perform another iteration through the training data. When the training period is complete, block 431 is answered positively. The subroutine returns in block 439 to block 407 of FIG. 8A. Block 407 returns to block 140 of FIG. 5.

Figures 9A, 9B:
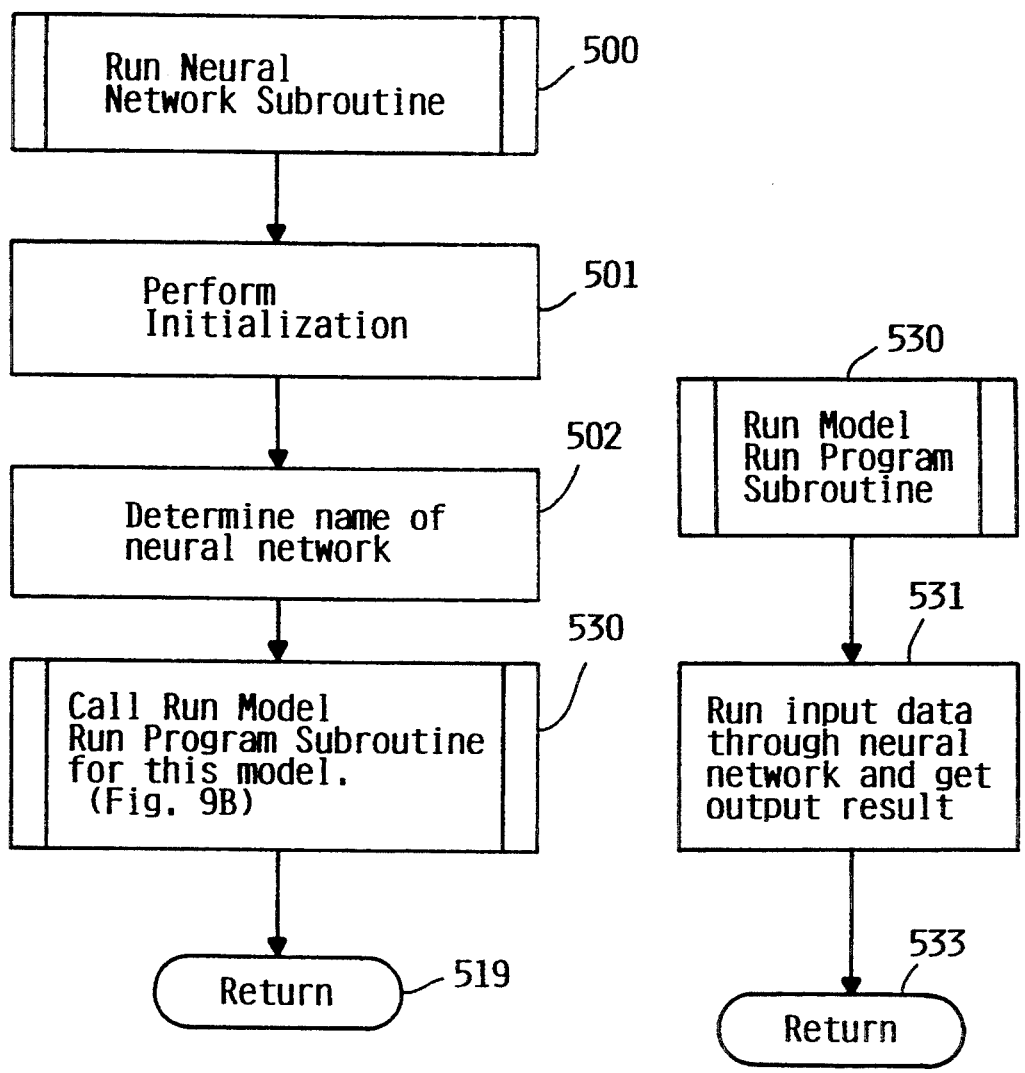

Since our user wants to run his newly trained neural network to identify coins, he answers block 140 affirmatively in FIG. 5, thereby calling the Run Neural Network Subroutine in block 500 (FIG. 9A). Alternatively, any application program can call the Run Neural Network Subroutine directly, thereby bypassing FIG. 5.

Referring now to FIG. 9A, block 501 performs the initialization routine built by block 251 of FIG. 6D. Block 502 determines the name of the neural network. Block 530 calls the Run Model Run Program Subroutine for this model of FIG. 9B. The Model Run Program was prepared by Build Model Run Program Subroutine of FIG. 6D, as has been discussed.

Referring now to FIG. 9B, block 531 runs the input data through the neural network and passes it back to Run Neural Network Subroutine 500 when block 533 returns to block 510 (FIG. 9A). Block 531 performs the routine built by blocks 253 and 254 in FIG. 6D.

Subroutine 500 returns in block 519 to block 190 in FIG. 5 where the program ends, or, alternatively, returns to the application program that called it.

FIGS. 19A–19D shows how our example coin identification neural network correctly identified a penny, nickel, dime and quarter. FIG. 20 shows what would happen if the following input data was run through the neural network: BRONZE LEFT Y N N N (numerically represented by 011000). We are asking our network to identify a bronze coin with a left profile, a building, but no eagle, leaves, or a torch. The network guesses that this coin is a nickel, but the nickel guess only scores a 0.4865323. The neural network is most confident by having a score approaching 1.00000. In this example, it clearly is not too confident that this coin is a nickel. In fact, there is no such coin having these attributes, so the network was correct to have a high degree of uncertainty.

While this invention has been described with respect to the preferred embodiment, it will be. understood by those skilled in the art that various changes in detail may be made therein without departing from the spirit, scope and teaching of the invention. For example, the selection of a specific neural network model for a specific problem type could become much more complex if there were more models defined to chose from. The selection process could be made based on an integer input data type in addition to real and binary data types. The input data size could be to look for the size of other user-specified parameters, such as window size or maximum number of destinations. Accordingly, the herein disclosed is to be limited only as specified in the following claims.

What is claimed is:

1. A program product for creating a neural network data structure for a neural network in a computer system, said program product comprising a plurality of instructions recorded on a computer readable recording medium and capable of being executed by said computer system, said instructions executed by said computer system comprising:

means for prompting a user for a problem type;
    means for prompting said user for an input data file, said input data file having an input data format;
    means for selecting a neural network model based on said problem type and said input data format;
    means for prompting said user for input data usage information; and
    means for creating said neural network data structure for said neural network model selected by said selecting means based on said input data usage information.

2. The program product of claim 1, wherein:
    said input data file further bas an input data file size; and said means for selecting a neural network mode is based on said problem type, said input data format, and said input data size.

3. The program product of claim 1, wherein said means for selecting a neural network model comprises means for selecting a model from among a set comprising a back propagation neural network model, an adaptive resonance neural network model, and a constraint satisfaction neural network model.

4. A program product for creating a neural network data structure for structure for a neural network in a computer system, said program product comprising a plurality of instructions recorded on a computer readable recording medium and capable of being executed by said computer system, said instructions executed by said computer system comprising:

means for prompting a user for a problem type;
means for selecting a neural network model based on said problem type;
means for prompting said user for input data usage information; and
means for cresting said neural network data structure for said neural network model selected by said selecting means based on said input data usage information.

5. The program product of claim 4, wherein said means for selecting a neural network model comprises means for selecting a model from among a set comprising a back propagation neural network model, an adaptive resonance neural network model, and a constraint satisfaction neural network model.

* * * * *